(12) United States Patent
Cho et al.

(10) Patent No.: US 11,630,343 B2
(45) Date of Patent: *Apr. 18, 2023

(54) DISPLAY APPARATUS

(71) Applicant: SAMSUNG ELECTRONICS CO., LTD., Suwon-si (KR)

(72) Inventors: Jin Hyun Cho, Suwon-si (KR); Nam Seok Roh, Suwon-si (KR); Sang Hyun Sohn, Suwon-si (KR); Jong Hee Han, Suwon-si (KR)

(73) Assignee: SAMSUNG ELECTRONICS CO., LTD., Suwon (KR)

( * ) Notice: Subject to any disclaimer, the term of this patent is extended or adjusted under 35 U.S.C. 154(b) by 67 days.

This patent is subject to a terminal disclaimer.

(21) Appl. No.: 16/956,883

(22) PCT Filed: Nov. 8, 2018

(86) PCT No.: PCT/KR2018/013574
§ 371 (c)(1),
(2) Date: Jun. 22, 2020

(87) PCT Pub. No.: WO2019/124735
PCT Pub. Date: Jun. 27, 2019

(65) Prior Publication Data
US 2021/0373386 A1    Dec. 2, 2021

(30) Foreign Application Priority Data
Dec. 22, 2017  (KR) .................. 10-2017-0177796

(51) Int. Cl.
*G02F 1/1335*    (2006.01)
*G02F 1/1334*    (2006.01)
(Continued)

(52) U.S. Cl.
CPC ...... *G02F 1/133601* (2021.01); *G02F 1/1334* (2013.01); *G02F 1/1343* (2013.01);
(Continued)

(58) Field of Classification Search
CPC ............. G02F 1/133524; G02F 1/1334; G02F 1/133601; G02F 1/133553; G02F 1/1343;
(Continued)

(56) References Cited

U.S. PATENT DOCUMENTS 10,197,849 B2 * 2/2019 Shinkai ............. G02F 1/134309
2010/0171903 A1 * 7/2010 Okuyama ............. G02B 6/0041
349/65
(Continued)

FOREIGN PATENT DOCUMENTS

KR    10-0494676 B1    9/2005
KR    10-2013-0079310 A    7/2013
(Continued)

OTHER PUBLICATIONS

International Search Report (PCT/ISA/210) dated Feb. 28, 2019 issued by the International Searching Authority in International Application No. PCT/KR2018/013574.
Communication dated Apr. 27, 2022, issued by the Korean Intellectual Property Office in Korean Patent Application No. 10-2017-0177796.
(Continued)

*Primary Examiner* — Jia X Pan
(74) *Attorney, Agent, or Firm* — Sughrue Mion, PLLC

(57) ABSTRACT

A display apparatus includes a light source emitting light; a light guide plate having a first surface and a second surface, and spreading light emitted from the light source therein to emit light through the first surface; and a local dimming unit configured to pass or scatter light emitted through the second surface of the light guide plate according to a position. The
(Continued)

local dimming unit may include: an electro-optical layer configured to which optical properties change according to an electric field; and a plurality of electrodes positioned on the same plane to generate the electric field.

8 Claims, 12 Drawing Sheets

(51) Int. Cl.
    *G02F 1/1343* (2006.01)
    *G02F 1/13357* (2006.01)
(52) U.S. Cl.
    CPC ......... *G02F 1/133524* (2013.01); *G02F 1/133553* (2013.01); *G02F 1/133615* (2013.01); *G02F 1/134363* (2013.01)
(58) Field of Classification Search
    CPC ........... G02F 1/134363; G02F 1/13439; G02F 1/133615
    See application file for complete search history.

(56) References Cited

U.S. PATENT DOCUMENTS

| | | | | |
|---|---|---|---|---|
| 2012/0257139 | A1* | 10/2012 | Shinkai | G02F 1/133615 349/61 |
| 2017/0090269 | A1* | 3/2017 | Huang | G02F 1/292 |
| 2019/0163015 | A1* | 5/2019 | Ko | G02F 1/133606 |

FOREIGN PATENT DOCUMENTS

| | | |
|---|---|---|
| KR | 10-1392790 B1 | 5/2014 |
| WO | 2017/172689 A1 | 10/2017 |

OTHER PUBLICATIONS

Communication dated Oct. 25, 2022, issued by the Korean Intellectual Property Office in Korean English Patent Application No. 10-2017-0177796.

* cited by examiner

DISPLAY APPARATUS

TECHNICAL FIELD

Embodiments of the disclosure relate to a display apparatus, more specifically to a display apparatus including an edge-type backlight unit.

BACKGROUND ART

In general, a display apparatus is an output device that visually displays received or stored image information to a user, and is used in various home-based or business fields.

For example, as a display apparatus, a monitor device connected to a personal computer or a server computer, a portable computer device, a navigation terminal device, a general television device, an Internet Protocol television (IPTV) device, a smartphone, a portable terminal device such as a tablet PC, a personal digital assistant (PDA), or a cellular phone, various display devices are used to play images such as advertisements or movies in an industrial field, or various other types of audio/video systems.

A display panel includes pixels arranged in a matrix form and thin film transistors (TFTs) provided in each of the pixels, and the amount of light passing through the pixels may change or the amount of light emitted from the pixels may change according to an image signal applied to the thin film transistor. The display apparatus can display an image by adjusting the amount of light emitted from each of the pixels of the display panel.

The display panel for displaying an image includes a self-luminous display panel that emits light according to the image itself, and a non-luminous display panel that blocks or passes light emitted from a separate light source according to the image.

The non-luminous display panels are typically liquid crystal display panels (LCD panels). The liquid crystal display panel may include a backlight unit that emits light and a liquid crystal panel that blocks or passes light emitted from the backlight unit.

The backlight unit may be classified into a direct-type backlight unit and an edge-type backlight unit according to the position of the light source.

The edge-type backlight unit includes a light guide plate that spreads light and a light source that emits light, and light enters the light guide plate from the light source located on the side of the light guide plate. The light incident on the light guide plate may move from the side of the light guide plate to the center through total internal reflection inside the light guide plate, and uniform surface light may be emitted from the entire light guide plate by a pattern located on the front or rear of the light guide plate.

The edge-type backlight unit is generally capable of implementing a backlight having a uniform thickness and a thin thickness, and a backlight using a smaller number of light sources than the direct-type backlight unit.

On the other hand, in implementing local dimming to different brightness according to the position, the edge-type backlight unit has a small area capable of realizing local dimming, and has difficulty in precisely controlling the local dimming.

DISCLOSURE

Technical Problem

One aspect provides a display apparatus and a control method thereof capable of performing local dimming to improve the contrast ratio of an image.

One aspect provides a display apparatus and a control method thereof capable of performing local dimming using an optical material that converts optical properties according to an electrical signal.

One aspect provides a display apparatus and a control method thereof capable of minimizing light loss (luminance loss) due to local dimming.

Technical Solution

In accordance with an aspect of the disclosure, a display apparatus includes a light source emitting light; a light guide plate having a first surface and a second surface, and configured to spread light emitted from the light source therein and to emit light through the first surface; and a local dimming unit configured to pass or scatter light emitted through the second surface of the light guide plate according to a position; and the local dimming unit may include an electro-optical layer configured to which optical properties change according to an electric field; and a plurality of electrodes positioned on the same plane to generate the electric field.

The electro-optical layer around at least one signal electrode may pass light when a voltage is applied to the at least one signal electrode among a plurality of the signal electrodes.

The light passing through the electro-optical layer may be spread inside the light guide plate.

The electro-optical layer around at least one signal electrode may scatter light when a voltage is not applied to the at least one signal electrode among a plurality of the signal electrodes.

The light scattered by the electro-optical layer may be emitted through the first surface of the light guide plate.

The plurality of electrodes may include a plurality of common electrodes; and a plurality of signal electrodes to which a voltage for generating the electric field is applied.

The plurality of signal electrodes may include a first signal electrode and a second signal electrode, and a portion of the light guide plate corresponding to the second signal electrode may be brighter than a portion corresponding to the first signal electrode.

The plurality of common electrodes and the plurality of signal electrodes may have a bar shape.

The plurality of common electrodes and the plurality of signal electrodes may be alternately arranged side by side.

The plurality of common electrodes and the plurality of signal electrodes may have a patch shape.

The plurality of common electrodes and the plurality of signal electrodes may be alternately arranged in rows and columns.

The plurality of electrodes reflects light passing through the electro-optical layer.

Scattering rate of the electro-optical layer changes depending on a presence of the electric field.

The electro-optical layer may pass light through when the electric field is present, and may scatter the light when the electric field is not present.

The electro-optical layer may include at least one of Polymer Dispersed Liquid Crystal (PDLC), Polymer Network Liquid Crystal (PNLC), Cholesteric Liquid Crystal, and Smectic Liquid Crystal.

In accordance with an aspect of the disclosure, a display apparatus includes a light source emitting light; and a local dimming unit provided on one surface of a light guide plate and allowing light emitted from the light guide plate to pass through or scatter according to a position. The local dimming unit includes: an electro-optical layer whose optical properties change according to an electric field; and a plurality of electrodes positioned on the same plane to generate the electric field.

The plurality of electrodes may include a plurality of common electrodes; and a plurality of signal electrodes to which a voltage for generating the electric field is applied.

When a voltage is applied to at least one of the plurality of signal electrodes, the electro-optical layer around the at least one signal electrode may pass light.

When no voltage is applied to at least one of the plurality of signal electrodes, the electro-optical layer around the at least one signal electrode may scatter light.

Advantageous Effects

According to a display apparatus, it is possible to perform local dimming to improve the contrast ratio of an image.

According to a display apparatus, it is possible to perform local dimming using an optical material that converts optical properties according to an electrical signal.

According to a display apparatus, it is possible to minimize light loss (luminance loss) due to local dimming.

MODE FOR INVENTION

Figure 1:
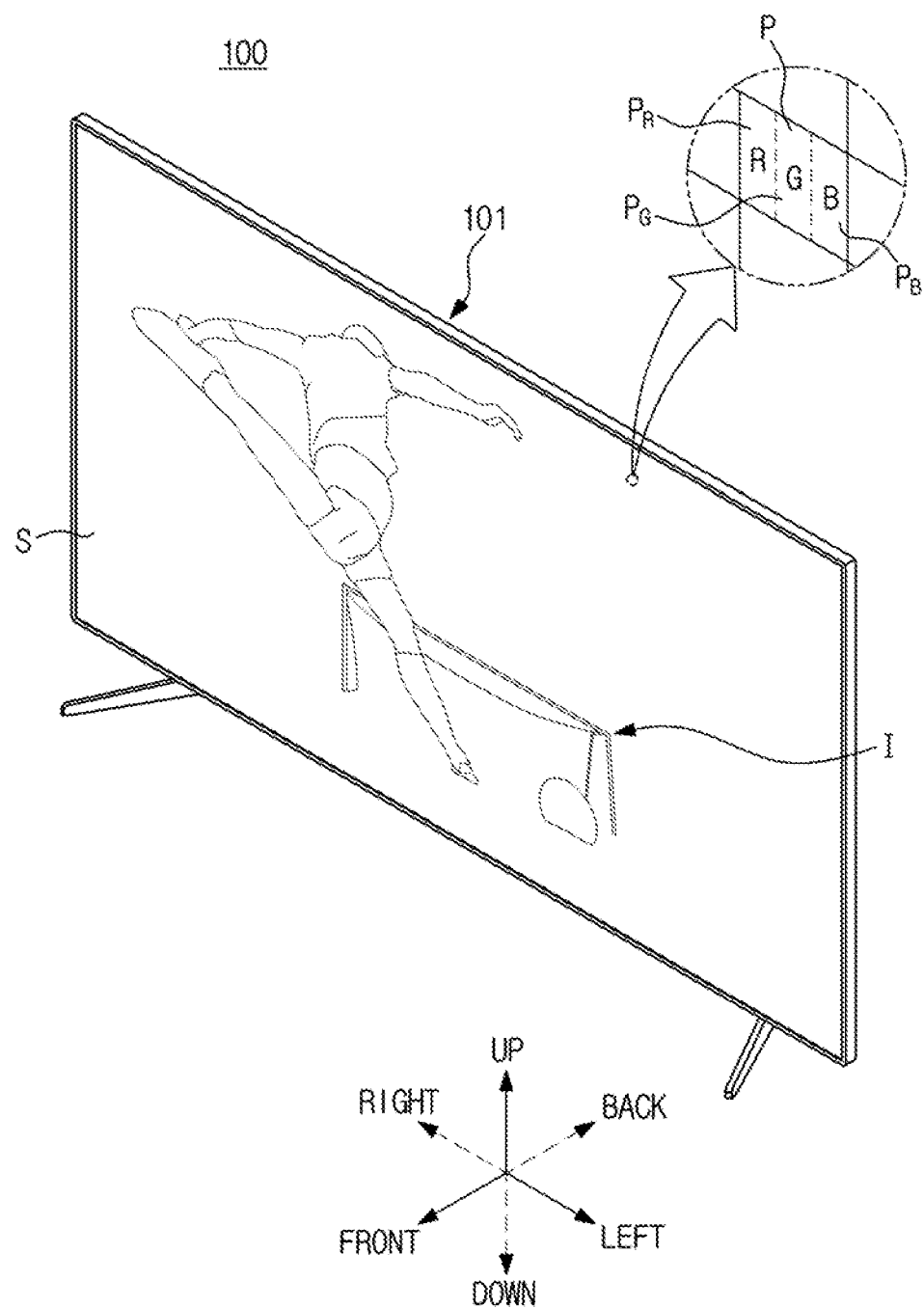
FIG. 1 is a view illustrating an appearance of a display apparatus according to an embodiment of the present disclosure.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

FIG. 1 is a view illustrating an appearance of a display apparatus according to an embodiment of the present disclosure.

A display apparatus 100 is a device capable of processing an image signal received from the outside and visually displaying the processed image. For example, the display apparatus 100 may be implemented in various forms such as a monitor, a portable multimedia device, a portable communication device, and a portable computing device. If the display apparatus 100 is a device that visually reproduces an image signal and acoustically reproduces an audio signal, its form is not limited.

In addition, the display apparatus 100 may be a large display apparatus (Large Format Display, LFD) installed outdoors, such as a roof of a building or a bus stop. Here, the outdoors is not necessarily limited to the outdoors, and the display apparatus 100 according to an embodiment may be installed in a subway station, a shopping mall, a movie-theater, a company, a shop, etc., wherever a large number of people can enter or exit.

The display apparatus 100 may receive a video signal and an audio signal from various content sources, and output video and audio corresponding to the video signal and the audio signal. For example, the display apparatus 100 may receive television broadcast content through a broadcast receiving antenna or a wired cable, receive content from a content playback device, or receive content from a content providing server of a content provider.

As shown in FIG. 1, the display apparatus 100 includes a main body 101 accommodating a plurality of parts for displaying an image, and a screen S provided on one side of the main body 101 to display an image I.

The main body 101 forms an external shape of the display apparatus 100, and a component for the display apparatus 100 to display the image I may be provided inside the main body 101. The main body 101 shown in FIG. 1 is a flat plate shape, but the shape of the main body 101 is not limited to that shown in FIG. 1. For example, the main body 101 may be curved such that both right and left ends protrude forward and the center is concave.

The screen S is formed on the front surface of the main body 101, and the image I as visual information may be displayed on the screen S. For example, a still image or a video may be displayed on the screen S, and a 2D flat image or a 3D stereoscopic image may be displayed.

A plurality of pixels P are formed on the screen S, and the image I displayed on the screen S may be formed by a combination of light emitted from the plurality of pixels P. For example, the light emitted by the plurality of pixels P may be combined as a mosaic to form the single image I on the screen S.

Each of the plurality of pixels P may emit light of various brightness and various colors.

In order to emit light of various brightness, each of the plurality of pixels P may include a configuration (for example, an organic light emitting diode) capable of directly emitting light, or include a configuration (for example, a liquid crystal panel) capable of transmitting or blocking light emitted by a backlight unit or the like.

In order to emit light of various colors, each of the plurality of pixels P may include sub-pixels $P_R$, $P_G$, and $P_B$.

The sub-pixels $P_R$, $P_G$, and $P_B$ include the red sub-pixel $P_R$ that can emit red light, the green sub-pixel $P_G$ that can emit green light, and the blue sub-pixel $P_B$ that can emit blue light. For example, the red light may represent light at a wavelength of approximately 620 nm (nanometer, 1 billionth of a meter) to 750 nm, the green light may represent light at a wavelength of approximately 495 nm to 570 nm, and the blue light may represent light from approximately 450 nm to 495 nm.

By combining the red light of the red sub-pixel $P_R$, the green light of the green sub-pixel $P_G$ and the blue light of the blue sub-pixel $P_B$, each of the plurality of pixels P emits light of various brightness and various colors.

The screen S shown in FIG. 1 is a flat plate shape, but the shape of the screen S is not limited to that shown in FIG. 1. For example, the screen S may have a shape in which both right and left ends protrude forward and the center portion is concave according to the shape of the main body 101.

The display apparatus 100 may include various types of display panels capable of displaying the image I. For example, the display apparatus 100 may be a liquid crystal display panel (LCD panel), or a light emitting diode panel (LED panel), or an organic light emitting diode panel (OLED).

Hereinafter, a display device including a liquid crystal display panel is described as an example of the display device 100.

Figure 2:
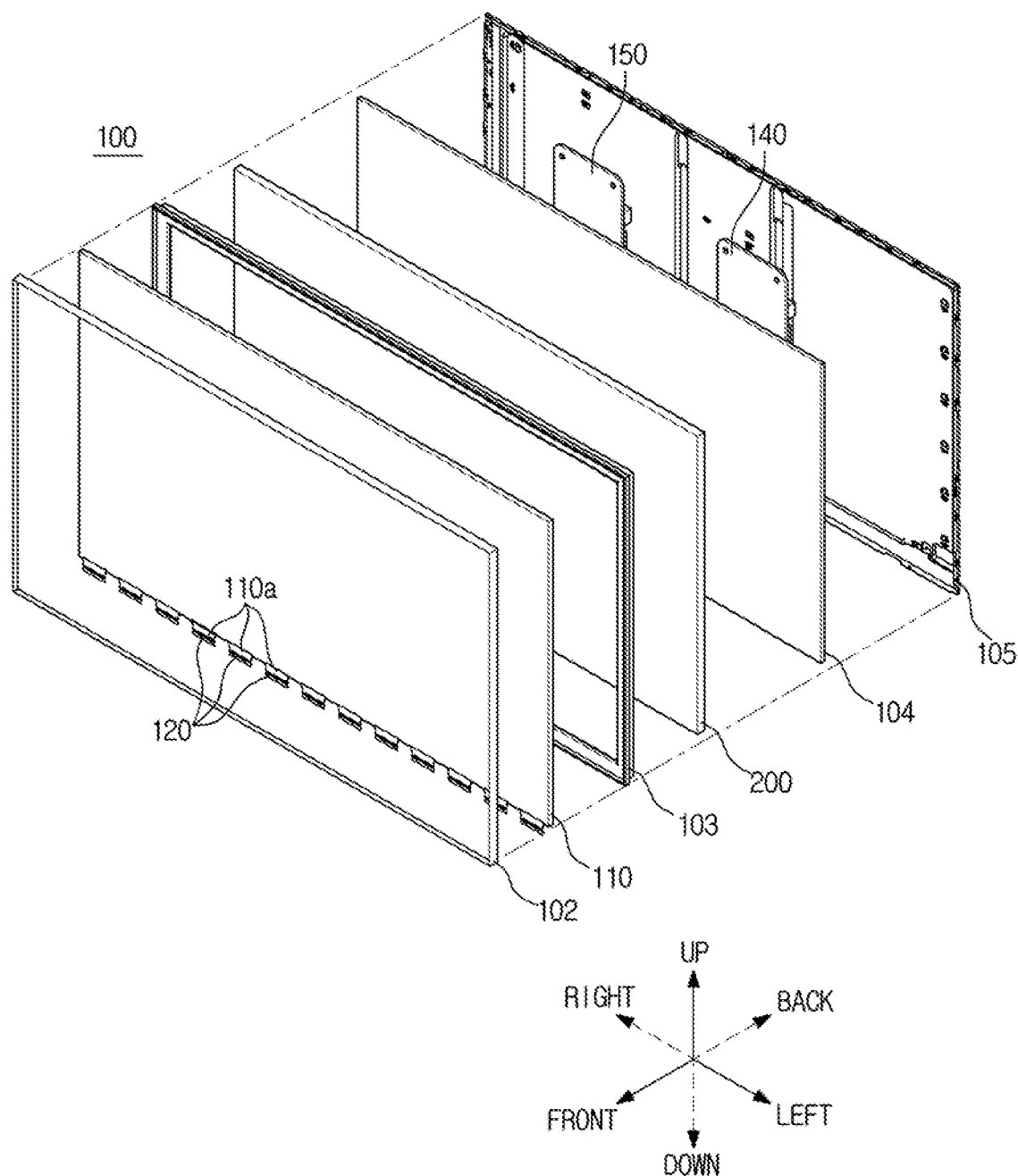
FIG. 2 is an exploded view of a display apparatus according to an embodiment.
Figure 3:
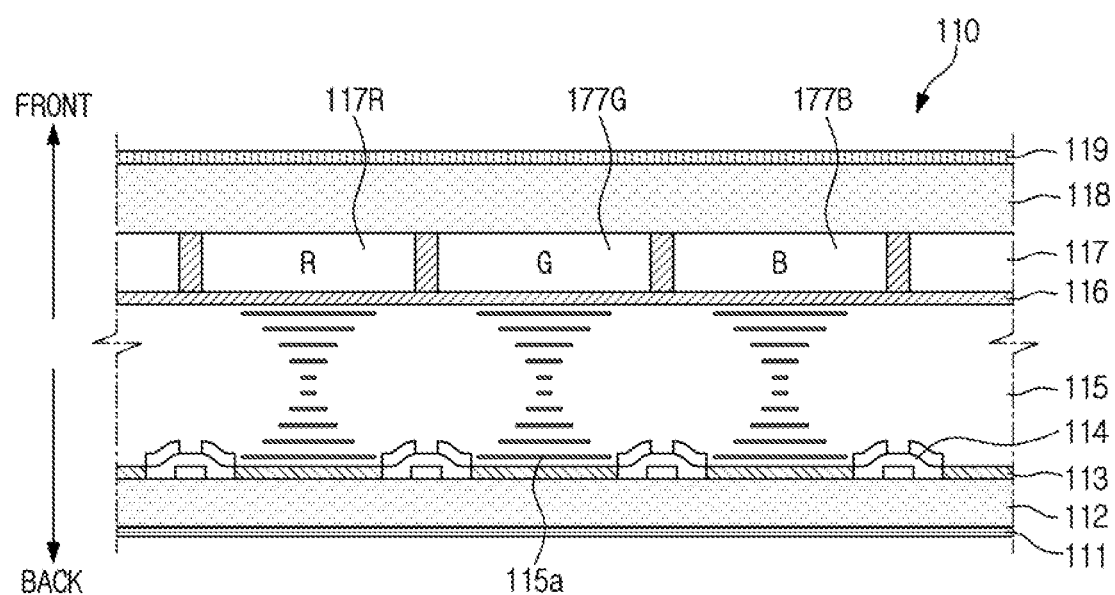
FIG. 3 shows an example of a liquid crystal panel included in a display apparatus according to an embodiment.

FIG. 2 is an exploded view of a display apparatus according to an embodiment. FIG. 3 shows an example of a liquid crystal panel included in a display apparatus according to an embodiment.

Referring to FIG. 2, various components for generating the image I on the screen S may be provided inside the main body 101.

For example, the main body 101 may have a backlight unit 200 that emits surface light forward, a liquid crystal panel 110 that blocks or passes the light emitted from the backlight unit 200, a control assembly 140 for controlling the operation of the backlight unit 200 and the liquid crystal panel 110, and a power supply assembly 150 supply power to the backlight unit 200 and the liquid crystal panel 110. In addition, the main body 101 may further include a bezel 102 for supporting and fixing the liquid crystal panel 110, the backlight unit 200, the control assembly 140, and the power supply assembly 150, a frame middle mold 103, a bottom chassis 104 and a rear cover 105.

The backlight unit 200 may include a point light source that emits monochromatic light or white light, and may refract, reflect, and scatter light to convert the light emitted from the point light source into uniform surface light. For example, the backlight unit 200 includes a light source that emits monochromatic light or white light, a light guide plate through which light is incident and spreads incident light from the light source, a reflective sheet that reflects the light emitted from the back of the light guide plate, and an optical sheet that refracts and scatters the light emitted from the front surface of the light guide plate.

As such, the backlight unit 200 may emit uniform surface light toward the front by refracting, reflecting, and scattering the light emitted from the light source.

The configuration and operation of the backlight unit 200 is described in more detail below.

The liquid crystal panel 110 is provided in front of the backlight unit 200, and blocks or passes the light emitted from the backlight unit 200 to form the image I.

The front surface of the liquid crystal panel 110 forms the screen S of the display apparatus 100 described above, and may include the plurality of pixels P. The plurality of pixels P included in the liquid crystal panel 110 may independently block or pass light from the backlight unit 200, and the light passed by the plurality of pixels P may form the image I displayed on the screen S.

For example, as shown in FIG. 3, the liquid crystal panel 110 includes a first polarizing film 111, a first transparent substrate 112, a pixel electrode 113, a thin film transistor 114, a liquid crystal layer 115, a common electrode 116, a color filter 117, a second transparent substrate 118, and a second polarizing film 119.

The first transparent substrate 112 and the second transparent substrate 118 are fixed to the pixel electrode 113, the thin film transistor 114, the liquid crystal layer 115, the common electrode 116, and the color filter 117. The first and second transparent substrates 112 and 118 may be made of tempered glass or transparent resin.

Outside the first and second transparent substrates 112 and 118, the first polarizing film 111 and the second polarizing film 119 are provided.

The first polarizing film 111 and the second polarizing film 119 may respectively pass specific light and block other light.

The light may consist of a pair of electric and magnetic fields that vibrate in a direction orthogonal to a traveling direction. The electric and magnetic fields constituting the light may vibrate in all directions orthogonal to the traveling direction of light, and a vibration direction of the electric field and a vibration direction of the magnetic field may be orthogonal to each other.

For example, the first polarizing film 111 passes light having a magnetic field vibrating in a first direction, and blocks other light. In addition, the second polarizing film 119 passes light having a magnetic field vibrating in a second direction, and blocks other light. At this time, the first direction and the second direction may be orthogonal to each other. In other words, a polarization direction of light passing through the first polarizing film 111 and a vibration direction of light passing through the second polarizing film 119 are orthogonal to each other. As a result, in general, light cannot pass through the first polarizing film 111 and the second polarizing film 119 at the same time.

The color filter 117 may be provided inside the second transparent substrate 118.

The color filter 117 may include a red filter 117R passing red light, a green filter 117G passing green light, and a blue filter 117B passing blue light. The red filter 117R, the green filter 117G, and the blue filter 117B may be arranged side by side.

The area where the color filter 117 is formed corresponds to the pixel P described above. In addition, the region where the red filter 117R is formed corresponds to the red sub-pixel $P_R$, the region where the green filter 117G is formed corresponds to the green sub-pixel $P_G$, and the region where the blue filter 117B is formed corresponds to the blue sub-pixel $P_B$.

The thin film transistor (TFT) 114 is provided inside the second transparent substrate 118. For example, the thin film transistor 114 may be provided at a position corresponding to a boundary between the red filter 117R, the green filter 117G, and the blue filter 117B.

The thin film transistor 114 may pass or block current flowing through the pixel electrode 113 to be described below. For example, an electric field may be formed or removed between the pixel electrode 113 and the common electrode 116 according to turn-on (closed) or turn-off (opening) of the thin film transistor 114.

The thin film transistor 114 may be made of poly-silicon, and may be formed by semiconductor processes such as lithography, deposition, and ion implantation.

The pixel electrode 113 may be provided inside the first transparent substrate 112, and the common electrode 116 may be provided inside the second transparent substrate 118.

The pixel electrode 113 and the common electrode 116 are made of a metal material that conducts electricity, and can generate an electric field for changing the arrangement of liquid crystal molecules 115a constituting the liquid crystal layer 115 to be described below.

The pixel electrode 113 is formed separately in regions corresponding to the red filter 117R, the green filter 117G, and the blue filter 117B, and the common electrode 116 extends from one side of the liquid crystal panel 110 to the other side. In other words, a plurality of the pixel electrodes 113 disposed in the same row may share the one common electrode 116. As a result, an electric field may be selectively formed in the liquid crystal layer 115 according to the position of the pixel electrode 113.

The pixel electrode 113 and the common electrode 116 are made of a transparent material and can pass light incident from the outside. For example, the pixel electrode 113 and the common electrode 116 are made of indium tin oxide (ITO), indium zinc oxide (IZO), silver nanowire, Ag nano wire, carbon nanotube (CNT), graphene or PEDOT (3,4-ethylenedioxythiophene).

The liquid crystal layer 115 is formed between the pixel electrode 113 and the common electrode 116, and the liquid crystal layer 115 is filled by the liquid crystal molecules 115a.

Liquid crystals show an intermediate state between a solid (crystal) and a liquid. In general materials, when heat is applied to a solid material, a state change occurs at the melting temperature from a solid state to a transparent liquid state. On the other hand, when heat is applied to the liquid crystal material in the solid state, the liquid crystal material changes to an opaque and cloudy liquid at the melting temperature and then to a transparent liquid state. Most of these liquid crystal materials are organic compounds, and the molecular shape has an elongated rod shape, and the arrangement of molecules is the same as an irregular state in one direction, but in other directions, it may have a regular crystal form. As a result, the liquid crystal has both the fluidity of liquid and the optical anisotropy of crystal (solid).

In addition, the liquid crystal may exhibit optical properties according to changes in an electric field. For example, the direction of the molecular arrangement constituting the liquid crystal may change according to a change in the electric field.

When an electric field is generated in the liquid crystal layer 115, the liquid crystal molecules 115a of the liquid crystal layer 115 are arranged according to the direction of the electric field. The liquid crystal molecules 115a may be irregularly arranged or may be disposed along an alignment layer (not shown) when an electric field is not generated in the liquid crystal layer 115.

As a result, the optical properties of the liquid crystal layer 115 may vary depending on the presence or absence of an electric field passing through the liquid crystal layer 115.

For example, in the case of a TN (Twisted Nematic) liquid crystal panel, the liquid crystal molecules 115a are arranged in a spiral shape, when an electric field is not formed in the liquid crystal layer 115, light may pass through the liquid crystal panel 110 due to the arrangement of the liquid crystal molecules 115a of the liquid crystal layer 115. On the other hand, when an electric field is formed in the liquid crystal layer 115, the liquid crystal molecules 115a are vertically disposed with respect to transparent substrates 22 and 28, and light does not pass through the liquid crystal panel 110.

As another example, in the case of a VA (Vertical Alignment) liquid crystal panel, the liquid crystal molecules 115a are vertically disposed with the transparent substrates 22 and 28, and when an electric field is not formed in the liquid crystal layer 115, light cannot pass through the liquid crystal panel 110 due to the arrangement of the liquid crystal molecules 115a of the liquid crystal layer 115. In addition, when an electric field is formed on the liquid crystal layer 115, the liquid crystal molecules 115a are disposed in parallel with the transparent substrates 22 and 28, and light may pass through the liquid crystal panel 110.

As another example, in the case of an IPS (In-Plane-Switching) liquid crystal panel, the liquid crystal molecules 115a may be horizontally disposed with the transparent substrates 22 and 28. In the case of the IPS liquid crystal display, both the pixel electrode 113 and the common electrode 116 are provided on the first transparent substrate 112, and an electric field in a direction parallel to the transparent substrates 22 and 28 may be formed on the liquid crystal layer 115. Depending on whether an electric field is formed on the liquid crystal layer 115, light may pass through the liquid crystal panel 110 or be blocked by the liquid crystal panel 110.

A cable 110a for transmitting image data to the liquid crystal panel 110 and a display driver integrated circuit (DDI) 120 (hereinafter referred to as 'driver IC') for processing digital image data and outputting an analog image signal on one side of the liquid crystal panel 110 are provided.

The cable 110a may electrically connect the control assembly 140/the power supply assembly 150 and the driver IC 120, and may also electrically connect the driver IC 120 and the liquid crystal panel 110. The cable 110a may include a flexible flat cable or a film cable that can be bent.

The driver IC 120 receives image data and power from the control assembly 140/the power supply assembly 150 through the cable 110a, and transmits the image data and the driving current to the liquid crystal panel 110 through the cable 110a.

In addition, the cable 110b and the driver IC 120 may be integrally implemented as a film cable, a chip on film (COF), a tape carrier package (TCP), or the like. In other words, the driver IC 120 may be disposed on the cable 110b. However, the present embodiment is not limited thereto, and the driver IC 120 may be disposed on the liquid crystal panel 110.

The control assembly 140 may include a control circuit that controls the operation of the liquid crystal panel 110 and the backlight unit 200. The control circuit may process image data received from an external content source, transmit the image data to the liquid crystal panel 110, and transmit dimming data to the backlight unit 200.

The power supply assembly 150 may supply electric power to the liquid crystal panel 110 and the backlight unit 200 for outputting surface light by the backlight unit 200, and for blocking and passing the light of the backlight unit 200 by the liquid crystal panel 110.

The control assembly 140 and the power supply assembly 150 may be implemented with a printed circuit board and various circuits mounted on the printed circuit board. For example, the power supply circuit may include a capacitor, a coil, a resistance element, a processor, and the like, and a power supply circuit board on which they are mounted. Further, the control circuit may include a memory, a processor, and a control circuit board on which they are mounted.

In the following, the backlight unit 200 is described.

Figure 4:
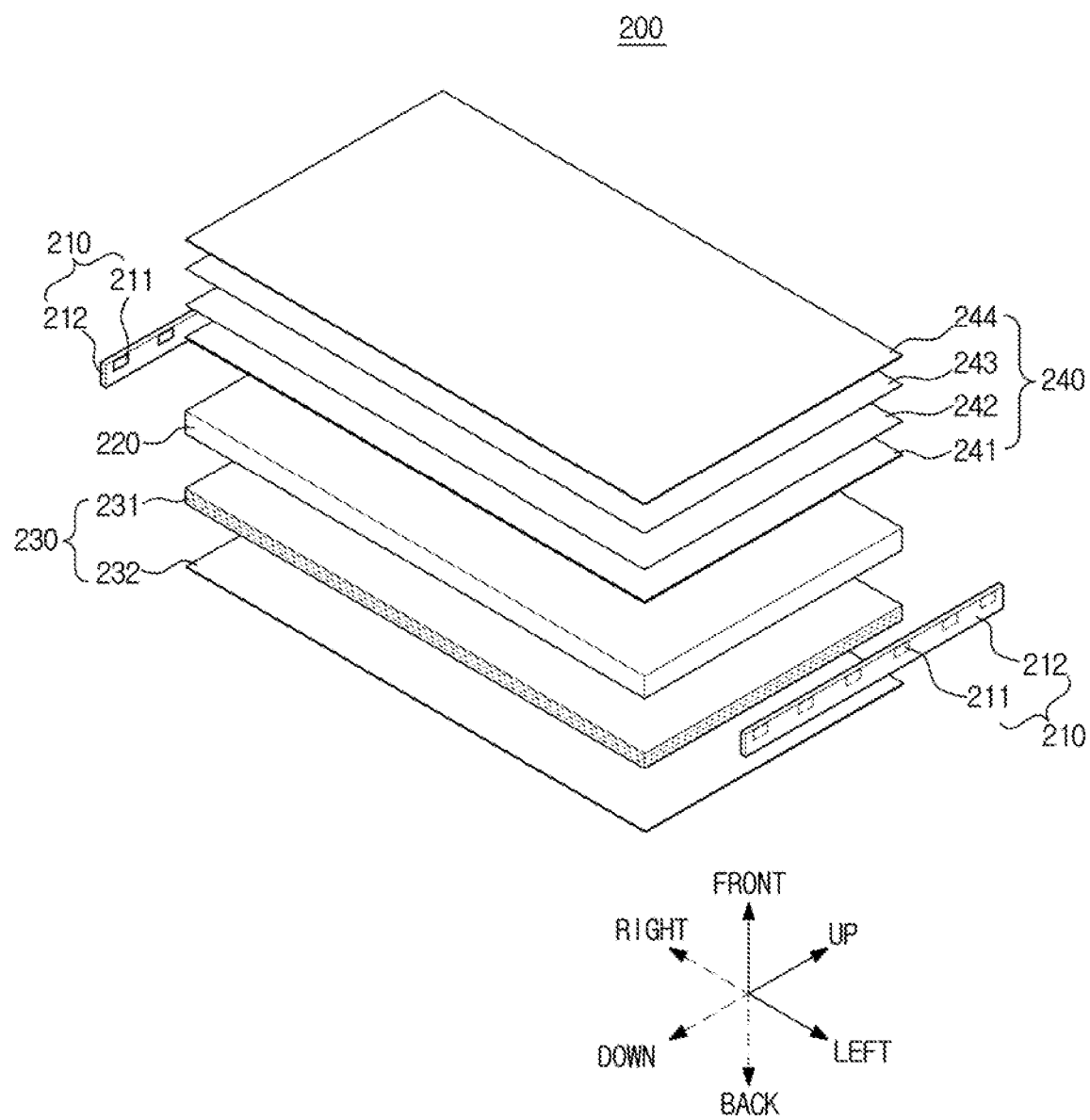
FIG. 4 shows an exploded backlight unit according to an embodiment.
Figure 5:
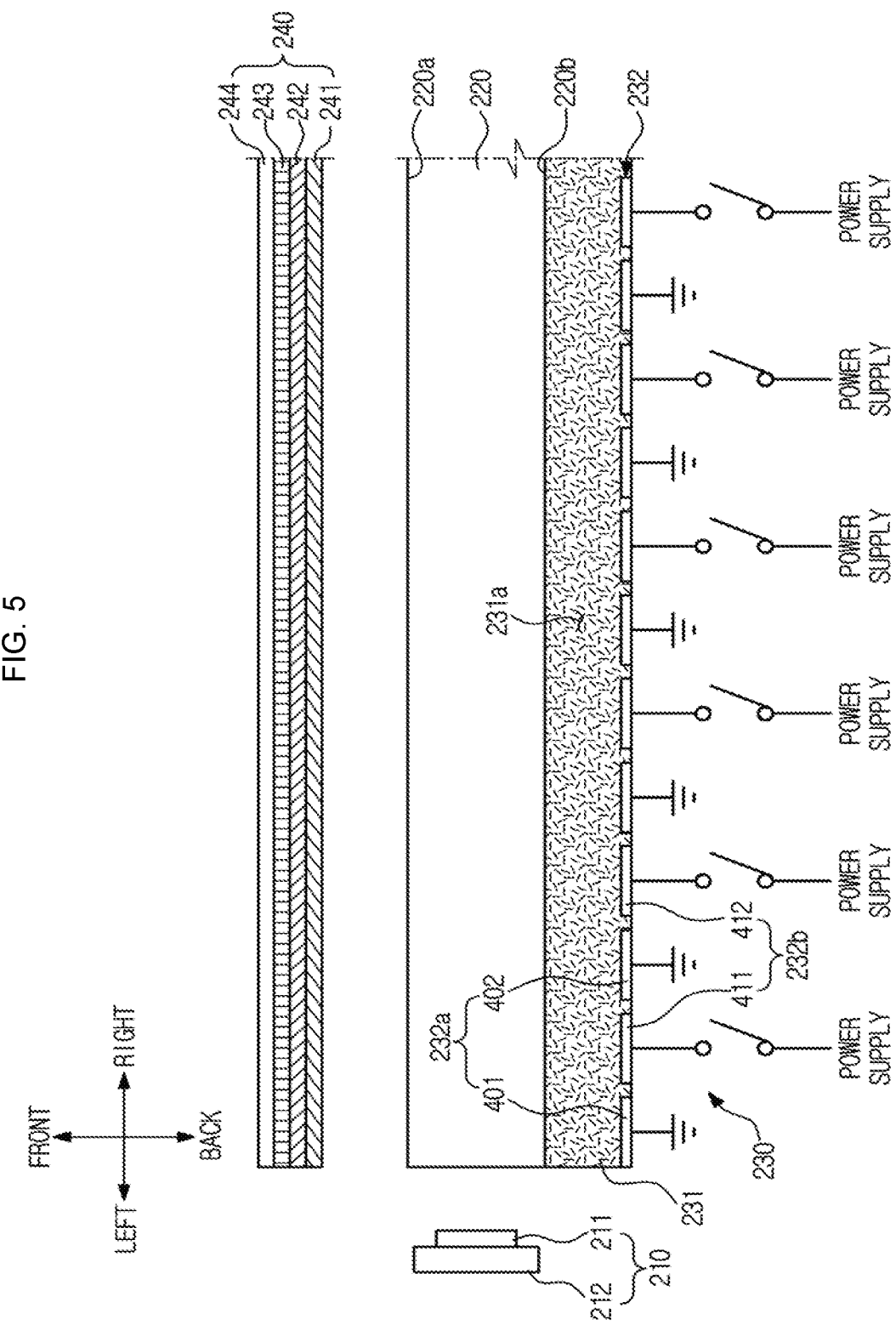
FIG. 5 shows a side cross-section of a backlight unit according to an embodiment.

FIG. 4 shows an exploded backlight unit according to an embodiment. FIG. 5 shows a side cross-section of a backlight unit according to an embodiment.

As shown in FIGS. 4 and 5, the backlight unit 200 includes a light emitting module 210 for emitting light, a light guide plate 220 for spreading light, a local dimming unit 230 that selectively refracts and/or reflects light, and an optical sheet 240 that improves the luminance of light.

The light emitting module 210 may include a plurality of light sources 211 emitting light and a support 212 supporting the plurality of light sources 211.

The plurality of light sources 211 may be disposed on the side surface of the light guide plate 220 and may emit light toward the center of the light guide plate 220. The plurality of light sources 211 may be disposed at equal intervals so that light incident on the light guide plate 220 has a uniform brightness. For example, as shown in FIG. 4, the plurality of light sources 211 may be disposed at equal intervals on the left and right sides of the light guide plate 220, respectively. However, the arrangement of the plurality of light sources 211 is not limited to that illustrated in FIG. 4. For example, the plurality of light sources 211 may be disposed on the upper and lower sides of the light guide plate 220 or may be disposed on only one of the left side surface or the right side surface of the light guide plate 220.

Each of the plurality of light sources 211 emits monochromatic light (light having a specific wavelength, for example, blue light), or white light (light mixed with light having various wavelengths, for example, red light, green light, and blue light). For example, each of the plurality of light sources 211 may employ a light emitting diode (LED) or a cold-cathode fluorescence lamp (CCFL).

The support 212 may fix the plurality of light sources 211 so that the positions of the plurality of light sources 211 are not changed. In addition, power may be supplied to the plurality of light sources 211 through the support 212.

The support 212 may be disposed on the side surface of the light guide plate 220 together with the plurality of light sources 211. For example, as shown in FIG. 4, the support 212 may be disposed on the left side of the light guide plate 220. However, the arrangement of the support 212 is not limited to that shown in FIG. 4. For example, the support 212 may be disposed on the upper and lower sides of the light guide plate 220 or may be disposed on only one of the left side surface or the right side surface of the light guide plate 220.

The support 212 fixes the plurality of light sources 211, and may be composed of a synthetic resin including a conductive power supply line for supplying power to the plurality of light sources 211, or may be composed of a printed circuit board (PCB).

The light guide plate 220 may change the traveling direction of light emitted from the plurality of light sources 211 disposed on the side surface, and emit the light toward the front. In particular, light emitted from the plurality of light sources 211 may be spread from an edge portion of the light guide plate 220 to a central portion of the light guide plate 220, and as a result, the light guide plate 220 emits uniform light toward the front.

A pattern for improving the straightness of light emitted from the plurality of light sources 211 may be formed on a front surface 220*a* of the light guide plate 220. The pattern formed on the front surface 220*a* of the light guide plate 220 may allow the light emitted from the plurality of light sources 211 to go straight in the emitted direction. For example, a lenticular lens may be formed on the front surface 220*a* of the light guide plate 220 in a direction in which light is emitted from the plurality of light sources 211, and the light emitted from the plurality of light sources 211 by the lenticular lens may go straight toward the central portion of the light guide plate 220.

Light incident into the light guide plate 220 may travel in various directions according to the incident angle. For example, light incident toward the front of the light guide plate 220 may be totally reflected on the front surface 220*a* of the light guide plate 220 and proceed toward the central portion of the light guide plate 220. In addition, the light incident toward the rear of the light guide plate 220 is reflected by the local dimming unit 230 provided at the rear of the light guide plate 220 to proceed toward the central portion of the light guide plate 220 or to the local dimming unit 230 by being refracted (or scattered) to be emitted through the front surface 220*a* of the light guide plate 220.

Light may travel from the edge portion of the light guide plate 220 to the central portion of the light guide plate 220 by total reflection from the front surface 220*a* of the light guide plate 220 and reflection from the local dimming unit 230. Further, light may be emitted to the front of the light guide plate 220 through the front surface 220*a* of the light guide plate 220 by refraction (or scattering) in the local dimming unit 230.

The light guide plate 220 may be made of poly methyl methacrylate (PMMA) or transparent polycarbonate (PC).

The optical sheet 240 may include various sheets for improving the brightness of light emitted through the front surface 220*a* of the light guide plate 220 or improving the uniformity of brightness. For example, the optical sheet 240 may include a diffusion sheet 241, a first prism sheet 242, a second prism sheet 243, and a reflective polarizing sheet 244.

The diffusion sheet 241 may spread light to improve the uniformity of luminance of light emitted through the front surface 220*a* of the light guide plate 220. The light emitted from the plurality of light sources 211 may be spread in the light guide plate 220 and spread again by the diffusion sheet 241.

The light can be emitted from the diffusion sheet 241 obliquely due to diffusion within the diffusion sheet 241. In other words, the emission angle representing the angle between the light emitted from the diffusion sheet 241 and the normal line of the diffusion sheet 241 may be greater than the incident angle indicating the angle between the light incident on the diffusion sheet 241 and the normal line of the diffusion sheet 241.

The first and second prism sheets 242 and 243 may focus the light emitted from the diffusion sheet 241. In other words, the first and second prism sheets 242 and 243 may refract the light emitted from the diffusion sheet 241 such that the light emitted obliquely from the diffusion sheet 241 advances toward the front.

The first and second prism sheets 242 and 243 include a prism pattern having a triangular prism shape, and a plurality of the prism patterns are arranged adjacent to each other to form a plurality of strips. At this time, the direction in which the prism patterns of the first prism sheet 242 are arranged and the direction in which the prism patterns of the second prism sheet 243 are arranged may be perpendicular to each other. Light passing through the first and second prism sheets 242 and 243 has a viewing angle of approximately 70 degrees and proceeds toward the front of the backlight unit 200, thereby improving luminance.

The reflective polarizing sheet 244 is a type of polarizing film, and may pass some of the incident light and reflect other portions. For example, light polarized in the same direction as a predetermined polarization direction of the reflective polarizing sheet 244 may be passed, and light polarized in a direction different from the polarization direction of the reflective polarizing sheet 244 may be reflected.

At this time, the polarization direction of the reflective polarizing sheet 244 may be the same as the polarization direction of the first polarizing film 111 included in the liquid crystal panel 110 described above. As a result, the light passing through the reflective polarizing sheet 244 may also pass through the first polarizing film 111 included in the liquid crystal panel 110.

In addition, the light reflected by the reflective polarizing sheet 244 is recycled inside the backlight unit 200, and the brightness of the backlight unit 200 may be improved by the light recycling.

The configuration included in the optical sheet 240 is not limited to the sheet or film described above, and may include more various sheets or films, such as a protective sheet. In addition, the stacking order of the diffusion sheet 241, the first prism sheet 242, the second prism sheet 243, and the reflective polarizing sheet 244 is not limited to that shown in FIG. 4, and the diffusion sheet 241, the first prism sheet 242, the second prism sheet 243, and the reflective polarizing sheet 244 may be stacked in various order.

The local dimming unit 230 includes an electro-optical layer 231 whose optical properties change according to an electric field, and a plurality of electrodes 232 for forming an electric field in the electro-optical layer 231.

The electro-optical layer 231 is located on a rear surface 220b of the light guide plate 220 and may be formed of an electro-optical material 231a. The electro-optical material 231a may exhibit an electro-optical effect. The electro-optical effect refers to a phenomenon in which the optical properties change according to the electric field. Specifically, the electro-optical effect refers to a phenomenon in which the refractive index, phase retardation, polarization characteristics, etc. of a material change depending on the existence of an electric field and/or the strength of the electric field.

Liquid crystal corresponds to a representative electro-optical material 231a. In the liquid crystal, the refractive index and polarization characteristics change depending on the presence of an electric field and/or the strength of the electric field. For example, Polymer Dispersed Liquid Crystal (PDLC), Polymer Network Liquid Crystal (PNLC), Cholesteric Liquid Crystal, Smectic Liquid Crystal, etc. may be used as the electro-optical material 231a.

An electro-chromic material may also correspond to the electro-optical material 231a. The electro-chromic material refers to a material whose color changes reversibly according to an oxidation-reduction reaction by application of a voltage. For example, tungsten oxide ($WO_3$) is reduced due to electron injection, and the color may change from colorless to blue.

An electrowetting material may also correspond to the electro-optical material 231a. Electrowetting may refer to changing the surface tension of liquid using electricity. For example, water droplets agglomerate by surface tension. When electricity is supplied to water droplets, the attraction force between the water droplets and the bottom surface increases, so that the water droplets spread over the bottom surface and the refractive index of the water droplets can be changed.

As such, the electro-optical material 231a of the electro-optical layer 231 may have optical properties that change depending on the existence of an electric field and/or the strength of the electric field.

For example, when an electric field is generated in the electro-optical layer 231, the electro-optical material 231a may refract incident light equally. In other words, the light incident on the electro-optical layer 231 may be refracted at the same refractive index regardless of where the light is incident, and may be refracted in the same direction regardless of where the light is incident. Therefore, when an electric field is generated in the electro-optical layer 231, the electro-optical layer 231 may be transparent. In other words, the electro-optical layer 231 can pass incident light.

If no electric field is generated in the electro-optical layer 231, the electro-optical material 231a may refract incident light in different directions with different refractive indices depending on the location. In other words, the light incident on the electro-optical layer 231 may be refracted by different refractive indices depending on the position where the light is incident, and may be refracted in different directions according to the position where the light is incident. Therefore, if an electric field is not generated in the electro-optical layer 231, the electro-optical layer 231 may be opaque. In other words, the electro-optical layer 231 may scatter incident light.

As another example, when an electric field is generated in the electro-optical layer 231, the electro-optical material 231a refracts incident light in different directions according to the position, with different refractive indices, and when an electric field is not generated in the electro-optical layer 231, the surface of the electro-optical material 231a may refract the incident light equally.

As described above, the electro-optical layer 231 may have a refractive index or a refractive direction changed according to the presence of an electric field and/or the strength of the electric field.

However, the present disclosure is not limited thereto, and it is sufficient if the electro-optical layer 231 changes its optical properties according to the presence and/or the strength of the electric field. For example, a phase delay or polarization direction of the electro-optical layer 231 may change according to the existence of an electric field and/or the strength of the electric field.

The plurality of electrodes 232 are provided opposite the light guide plate 220 around the electro-optical layer 231.

The electro-optical material 231a may be filled between the plurality of electrodes 232 and the light guide plate 220, and the electro-optical layer 231 may be formed between the plurality of electrodes 232 and the light guide plate 220.

The plurality of electrodes 232 may be located on the same plane as illustrated in FIG. 5. The plurality of electrodes 232 is not provided between the light guide plate 220 and the electro-optical layer 231, and all of the plurality of electrodes 232 may be provided opposite the light guide plate 220 around the electro-optical layer 231.

The plurality of electrodes 232 may control an electric field in the electro-optical layer 231. The plurality of electrodes 232 may include common electrodes 232a and signal electrodes 232b. The common electrodes 232a and the signal electrodes 232b may be arranged side by side on the same plane, and may also be alternately disposed on the same plane.

The common electrodes 232a may be connected to ground or may be connected to each other. The common electrodes 232a may output a reference potential (e.g., '0V') to the signal electrodes 232b.

The signal electrodes 232b may receive a voltage for generating an electric field. When a voltage is applied to the signal electrodes 232b, an electric field may be formed between a preferred electrode to which the voltage is applied and peripheral common electrodes.

For example, as illustrated in FIG. 5, the plurality of electrodes 232 may include a first common electrode 401, a first signal electrode 411 and a second common electrode 402. The plurality of electrodes 232 may include a second signal electrode 412, the first common electrode 401, the first signal electrode 411, and the second common electrode 402. The second signal electrode 412 may be provided on the surface of the electro-optical layer 231. In addition, the first common electrode 401 and the second common electrode 402 may be disposed on both sides of the first signal electrode 411. When a voltage is applied to the first signal electrode 411, an electric field may be formed between the first signal electrode 411 and the first common electrode 401, and an electric field may be formed between the first signal electrode 411 and the second common electrode 402.

The plurality of electrodes 232 may reflect light with a high reflectance. When the electro-optical layer 231 is transparent, light may be incident from the light guide plate 220 to the electro-optical layer 231, and it may pass through the transparent electro-optical layer 231. The plurality of electrodes 232 may reflect the light passing through the electro-optical layer 231 with high reflectance.

In other words, when the electro-optical layer 231 is transparent, the plurality of electrodes 232 may reflect light emitted through the rear surface 220b of the light guide plate 220 to the light guide plate 220.

The common electrodes 232a and the signal electrodes 232b may be made of a conductive material capable of passing electricity. The surfaces of the common electrodes 232a and the signal electrodes 232b may be made of a material having high reflectance to light.

For example, the common electrodes 232a and the signal electrodes 232b may each be made of silver (Ag) or may be made of metal such as copper or aluminum coated with silver (Ag). Further, the common electrodes 232a and the signal electrodes 232b may be manufactured by coating a polymer having high reflectivity on a base material having electrical conductivity.

As described above, the electro-optical layer 231 may pass light (refraction in one direction) or scatter light (refraction in multiple directions) depending on whether an electric field is generated. The plurality of electrodes 232 generating an electric field in the electro-optical layer 231 has high light reflectance.

For example, when an electric field is generated in the electro-optical layer 231 by the plurality of electrodes 232, light emitted through the rear surface 220b of the light guide plate 220 may pass through the electro-optical layer 231 and be reflected by the plurality of electrodes 232 to be incident on the light guide plate 220. In addition, if an electric field is not generated in the electro-optical layer 231 by the plurality of electrodes 232, light emitted through the rear surface 220b of the light guide plate 220 is scattered within the electro-optical layer 231, and a part of the light may pass through the light guide plate 220 and be emitted through the front surface 220a of the light guide plate 220.

In other words, light is emitted through the front surface 220a of the light guide plate 220 at a position corresponding to an opaque portion of the electro-optical layer 231. The backlight unit 200 may emit bright light at a position corresponding to the opaque portion of the electro-optical layer 231 compared to other positions.

Hereinafter, the operation of the backlight unit 200 including the local dimming unit 230 will be described in more detail.

Figure 6:
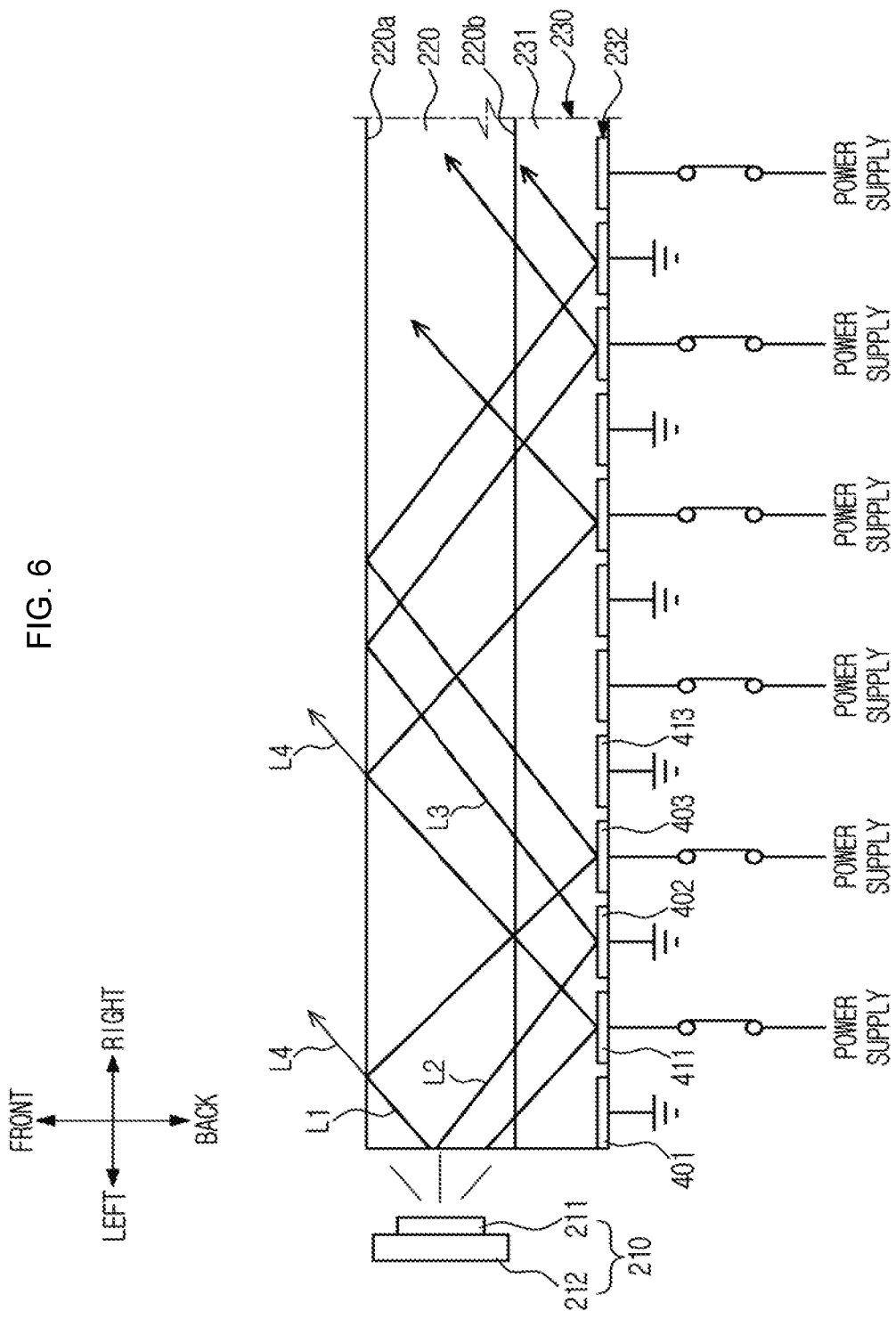
FIG. 6 shows an example of an operation of a backlight unit according to an embodiment.
Figure 7:
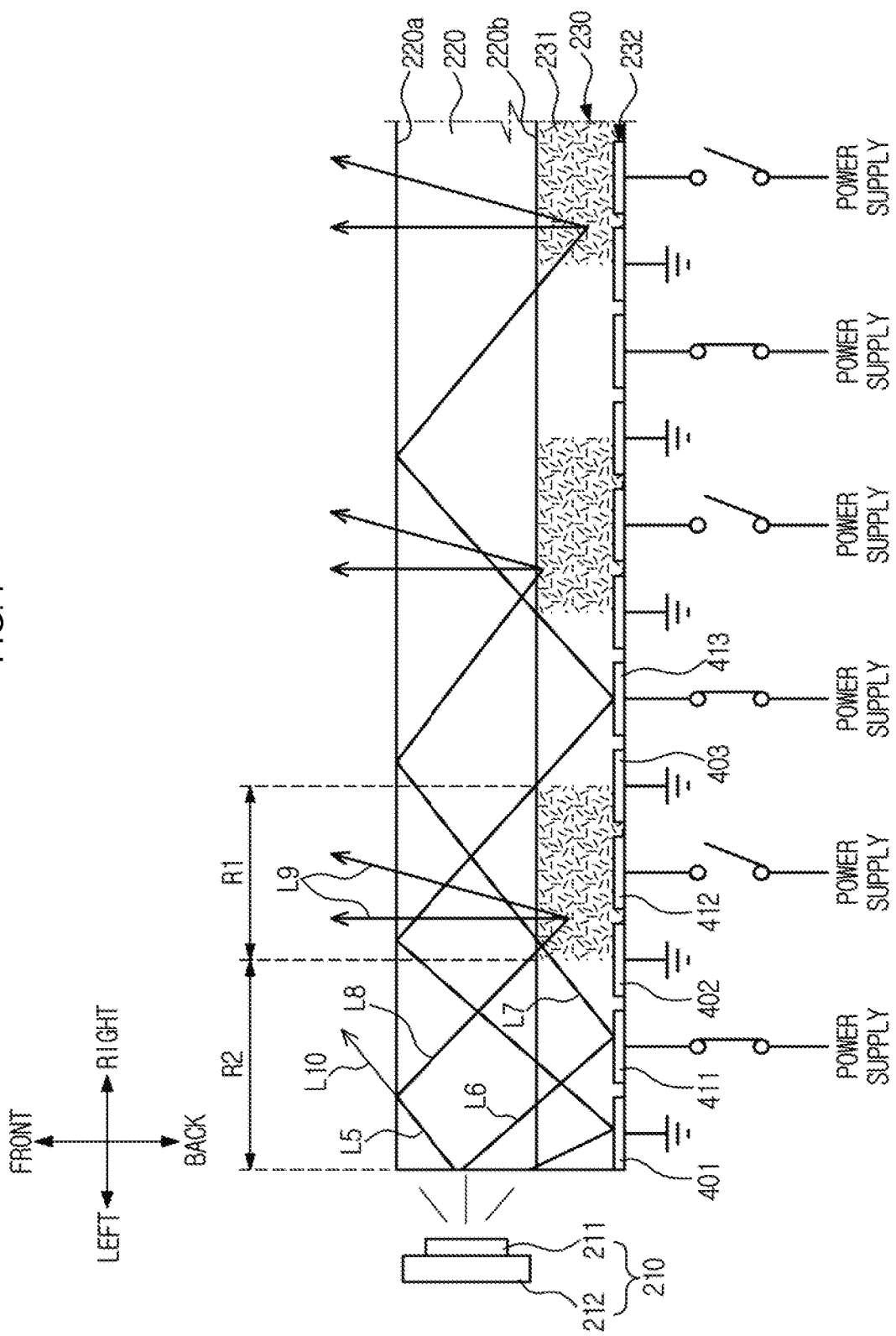
FIG. 7 shows another example of an operation of a backlight unit according to an embodiment.

FIG. 6 shows an example of an operation of a backlight unit according to an embodiment. FIG. 7 shows another example of an operation of a backlight unit according to an embodiment.

As shown in FIGS. 6 and 7, the backlight unit 200 includes the light source 211, the light guide plate 220, and the local dimming unit 230.

The light source 211 may be provided at the edge portion of the light guide plate 220 to emit monochromatic light or white light, and the light guide plate 220 may spread light emitted from the light source 211 provided at the edge portion to the central portion and emit light toward the front.

The local dimming unit 230 may include the electro-optical layer 231 that transmits or scatters light according to an electric field, and the plurality of electrodes 232 that generate an electric field in the electro-optical layer 231.

The electro-optical layer 231 may be provided between the light guide plate 220 and the plurality of electrodes 232, and may include the electro-optical material 231a whose optical properties change according to an electric field. For example, when an electric field is generated, the electro-optical material 231a of the electro-optical layer 231 may pass light, and if an electric field is not generated, the electro-optical material 231a may scatter light.

The plurality of electrodes 232 may include the common electrodes 232a and the signal electrodes 232b. Specifically, the plurality of electrodes 232 include the first common electrode 401, the first signal electrode 411, the second common electrode 402, the second signal electrode 412, a third common electrode 403, and a third signal electrode 413. The first, second, and third common electrodes 401, 402, and 403 may represent a reference potential, The first, second, and third signal electrodes 411, 412, and 413 can each receive a voltage for generating an electric field.

As illustrated in FIG. 6, voltages may be applied to the first signal electrode 411, the second signal electrode 412, and the third signal electrode 413. As a result, an electric field may be generated between the first, second, and third signal electrodes 411, 412, and 413 and the first, second, and third common electrodes 401, 402, and 403.

In other words, an electric field may be generated throughout the electro-optical layer 231. Light may pass through the electro-optical layer 231 through the electro-optical layer 231 because an electric field is generated throughout the electro-optical layer 231.

Specifically, when power is supplied to the light source 211, the light source 211 may emit light toward the light guide plate 220. The light emitted from the light source 211 may be incident into the light guide plate 220. Light incident from the edge portion of the light guide plate 220 may propagate along the light guide plate 220 to the central portion of the light guide plate 220 by total reflection inside the light guide plate 220.

For example, a light L1 traveling toward the front surface 220a of the light guide plate 220 may be totally reflected on the front surface 220a of the light guide plate 220. Since the refractive index of the light guide plate 220 is greater than the refractive index of air, the light L1 directed from the light guide plate 220 into the air may be totally reflected at a boundary between the light guide plate 220 and air according to the incident angle.

A light L2 traveling toward the rear surface 220b of the light guide plate 220 may pass through the rear surface of the light guide plate 220 and enter the electro-optical layer 231. Since there is no significant difference between the refractive index of the light guide plate 220 and the refractive index of the electro-optical layer 231, the light L2 from the light guide plate 220 toward the electro-optical layer 231 may pass through a boundary between the light guide plate 220 and the electro-optical layer 231.

The light L2 incident from the light guide plate 220 to the electro-optical layer 231 may propagate to the plurality of electrodes 232 inside the electro-optical layer 231. Since an electric field is formed inside the electro-optical layer 231 by the plurality of electrodes 232, the electro-optical layer 231 can pass light, and the light L2 incident on the electro-optical layer 231 may pass through the electro-optical layer 231 to reach the plurality of electrodes 232. The light L2 reaching the plurality of electrodes 232 may be reflected by the plurality of electrodes 232.

A light L3 reflected from the plurality of electrodes 232 may propagate toward the light guide plate 220 through the electro-optical layer 231. Further, the light L3 reflected from the plurality of electrodes 232 may pass through the boundary between the electro-optical layer 231 and the light guide plate 220 and enter the light guide plate 220.

The light L3 incident inside the light guide plate 220 may propagate toward the central portion of the light guide plate 220. Further, the light L3 incident into the light guide plate 220 may be totally reflected on the front surface 220a of the light guide plate 220.

In this way, the light emitted from the light source 211 may be propagated from the edge portion of the backlight unit 200 to the center portion inside the light guide plate 220 and the local dimming unit 230 by total reflection.

In addition, some of a light L4 traveling toward the front surface 220a of the light guide plate 220 may be emitted to the outside through the front surface 220a of the light guide plate 220. The ratio of the light L4 emitted from the light guide plate 220 among the lights L1 and L3 traveling toward the front surface 220a of the light guide plate 220 may be constant regardless of the position. In other words, uniform light may be emitted from the entire light guide plate 220.

On the other hand, as illustrated in FIG. 7, voltages may be applied to the first signal electrode 411 and the third signal electrode 413, and a voltage may not be applied to the second signal electrode 412. As a result, an electric field is generated between the first signal electrode 411 and the second common electrode 402 and between the third signal electrode 413 and the third common electrode 403, and an electric field may not be generated between the second signal electrode 412 and the second/third common electrodes 402 and 403.

In other words, an electric field may be partially generated in the electro-optical layer 231. Thereby, the electro-optical layer 231 can be partially transparent. Specifically, the electro-optical layer 231 may be transparent at the portion where the electric field is generated, and the electro-optical layer 231 may be opaque at the portion where the electric field is not generated. In addition, light can pass through the transparent portion of the electro-optical layer 231. Light does not pass through the opaque portion of the electro-optical layer 231 and light may be scattered in the opaque portion of the electro-optical layer 231.

Specifically, when power is supplied to the light source 211, the light source 211 may emit light toward the light guide plate 220. The light emitted from the light source 211 may be incident into the light guide plate 220. Light incident from the edge portion of the light guide plate 220 may propagate along the light guide plate 220 to the central portion of the light guide plate 220 by total reflection inside the light guide plate 220.

For example, a light L5 traveling toward the front surface 220a of the light guide plate 220 may be totally reflected on the front surface 220a of the light guide plate 220.

Lights L6 and L8 traveling toward the rear surface 220b of the light guide plate 220 may pass through the rear surface of the light guide plate 220 and enter the electro-optical layer 231. The lights L6 and L8 incident on the electro-optical layer 231 may be propagated or scattered to the plurality of electrodes 232 depending on whether the electro-optical layer 231 is transparent or opaque.

The light L6 incident on the transparent portion of the electro-optical layer 231 may pass through the electro-optical layer 231 to reach the plurality of electrodes 232. Further, the light L6 may be reflected by the plurality of electrodes 232, and a light L7 reflected by the plurality of electrodes 232 may propagate toward the central portion of the light guide plate 220.

The light L8 incident on the opaque portion of the electro-optical layer 231 may be scattered from the electro-optical layer 231. Specifically, the light L8 may be refracted in various directions by the electro-optical material 231a in the opaque portion of the electro-optical layer 231. The electro-optical layer 231 may appear opaque because the incident light is refracted in various directions without consistency.

Some of a light L9 refracted in various directions may be refracted in a direction similar to a normal direction of the front surface 220a of the light guide plate 220. In other words, the angle between the light L9 scattered in the electro-optical layer 231 and the normal line of the front surface 220a of the light guide plate 220 (hereinafter referred to as "incident angle") may be smaller than a critical angle for generating total reflection. Therefore, the light L9 scattered from the electro-optical layer 231 may be emitted to the outside through the front surface 220a of the light guide plate 220.

In addition, as described above with reference to FIG. 6, some of a light L10 traveling toward the front surface 220a of the light guide plate 220 passes through the front surface 220a of the light guide plate 220, and may be released outside.

The intensity of the light L9 emitted from the light guide plate 220 by scattering in the electro-optical layer 231 may be greater than the intensity of the light L10 passing through the front surface 220a of the light guide plate 220 without total reflection from the front surface 220a of the light guide plate 220.

Accordingly, the intensity of the light L9 emitted from a first region R1 corresponding to the portion where light is scattered in the electro-optical layer 231 may be greater than the intensity of the light L10 emitted from a second region R2 corresponding to the portion passing through the electro-optical layer 231. In other words, the intensity of the light L9 emitted from the first region R1 corresponding to the second signal electrode 412 to which the voltage is applied in the backlight unit 200 may be greater than the intensity of the light L10 emitted from the second region R2 corresponding to the first and third signal electrodes 411 and 413.

Therefore, the intensity of light emitted from the light guide plate 220 may be non-uniform depending on the position, and the intensity of light according to the position may be controlled. Specifically, the intensity of light emitted from a specific region of the light guide plate 220 may be controlled according to whether a voltage is applied to the signal electrodes 232b. In other words, active local dimming can be implemented.

In the above, the electro-optical material that becomes transparent when the electric field is applied and becomes opaque when the electric field is removed has been described, but is not limited thereto. For example, the electro-optical material can be opaque when an electric field is applied and transparent when the electric field is removed.

Figure 8:
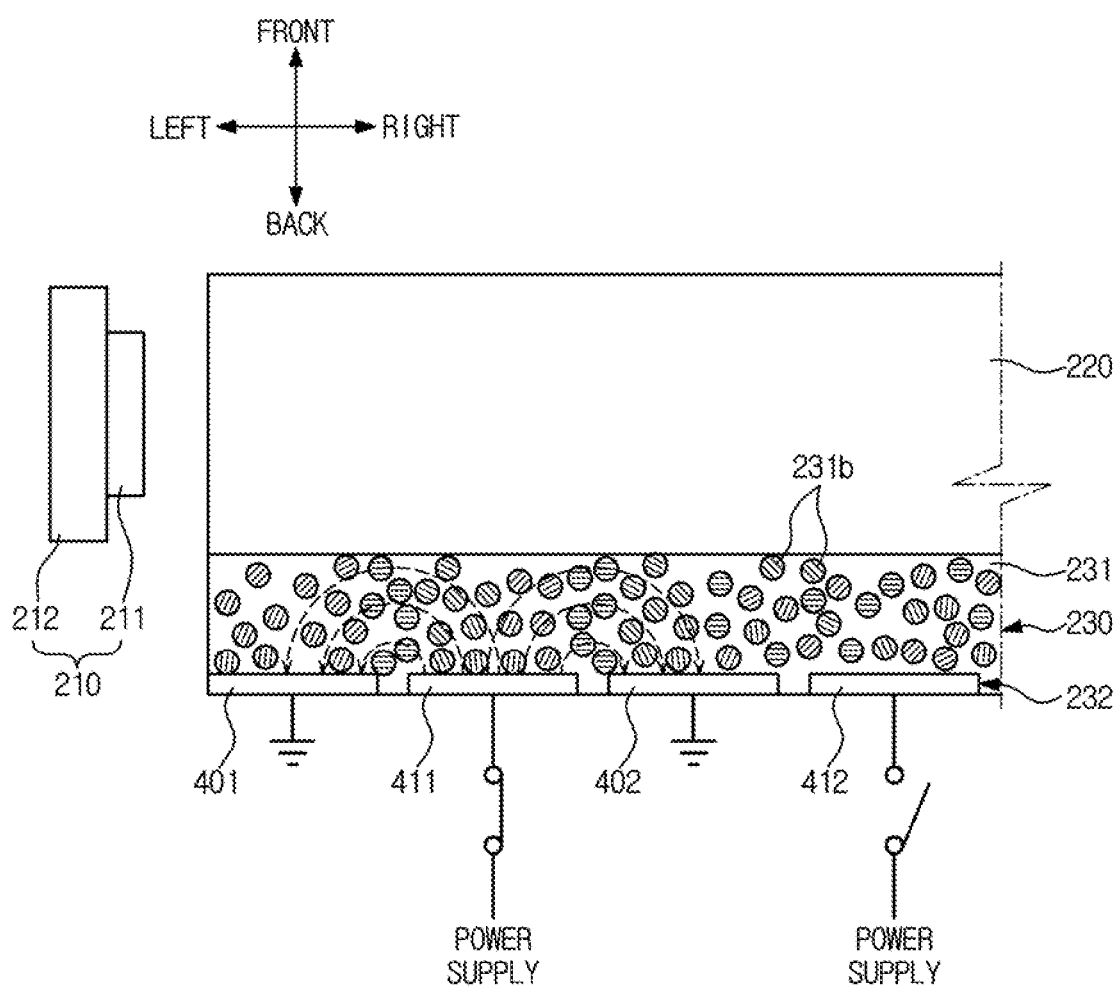
FIG. 8 shows an implementation example of a backlight unit according to an embodiment.

FIG. 8 illustrates an implementation example of a backlight unit according to an embodiment.

The backlight unit 200 includes the light source 211, the light guide plate 220, and the local dimming unit 230, and the local dimming unit 230 includes the electro-optical layer 231 and the plurality of electrodes 232. The light source 211, the light guide plate 220, and the plurality of electrodes 232 may be the same as those shown in FIGS. 6 and 7.

As shown in FIG. 8, the electro-optical layer 231 is provided between the light guide plate 220 and the plurality of electrodes 232, and may include a polymer dispersed liquid crystal (PDLC) 231b whose polymer optical properties change according to an electric field.

The polymer dispersed liquid crystal 231b can be formed by preparing immiscible mixtures (emulsions) of a liquid crystal and a polymer. The mixture can have both the structural advantages of the polymer and the electro-optical properties of the liquid crystal.

A liquid-state liquid crystal and a liquid-state polymer may be mixed to form an emulsion. In addition, optically curable adhesives that can be cured by ultraviolet light (optically curing adhesives), for example, poly-acrylates or poly-thiolenes and the like can be used. As the curing of the polymer proceeds, phase separation between the liquid crystal and the immiscible polymer may occur. Specifically, the polymer may be cured in a mixture of the liquid crystal and the polymer such that droplets of liquid crystal are separated from the polymer structure. As a result, the polymer dispersed liquid crystal 231b can be produced.

When the concentration of the polymer in the mixture is 30% to 50%, a liquid crystal barrier that is micro in scale can be prepared. The liquid crystal molecules of the liquid crystal droplets are locally aligned, but each liquid crystal droplet may be randomly aligned. Due to the size of the liquid crystal droplets and the isotropic nature of the liquid crystal droplets, the polymer dispersed liquid crystal 231b scatters light and has a milky color.

When an electric field is applied to the polymer dispersed liquid crystal 231b, the liquid crystal droplets undergo electro-optical rearrangement, and the degree of scattering of the polymer dispersed liquid crystal 231b can be reduced and become transparent.

As shown in FIG. 8, a voltage may be applied to the first signal electrode 411 and no voltage may be applied to the second signal electrode 412. As a result, an electric field may be generated between the first signal electrode 411 and the second common electrode 402, and an electric field may not be generated between the second signal electrode 412 and the second common electrode 402. In other words, an electric field may be partially generated in the electro-optical layer 231.

The liquid crystal droplets of the polymer dispersed liquid crystal 231b in the portion where the electric field is generated (between the first signal electrode and the second common electrode) may be aligned by the electric field, and the light scattering property of the polymer dispersed liquid crystal 231b may be reduced. Therefore, the polymer dispersed liquid crystal 231b can be made transparent in the portion where the electric field is generated. In addition, the light emitted from the light source 211 may pass through the transparent polymer dispersed liquid crystal 231b.

The liquid crystal droplets of the polymer dispersed liquid crystal 231b in the portion where the electric field is not generated (between the second signal electrode and the second common electrode) may be aligned in any direction, and the polymer dispersed liquid crystal 231b may have light scattering properties. Therefore, the polymer dispersed liquid crystal 231b may become opaque in a portion where no electric field is generated. In addition, the light emitted from the light source 211 may be scattered by the opaque polymer dispersed liquid crystal 231b and may be emitted through the front surface 220a of the light guide plate 220.

Figure 9:
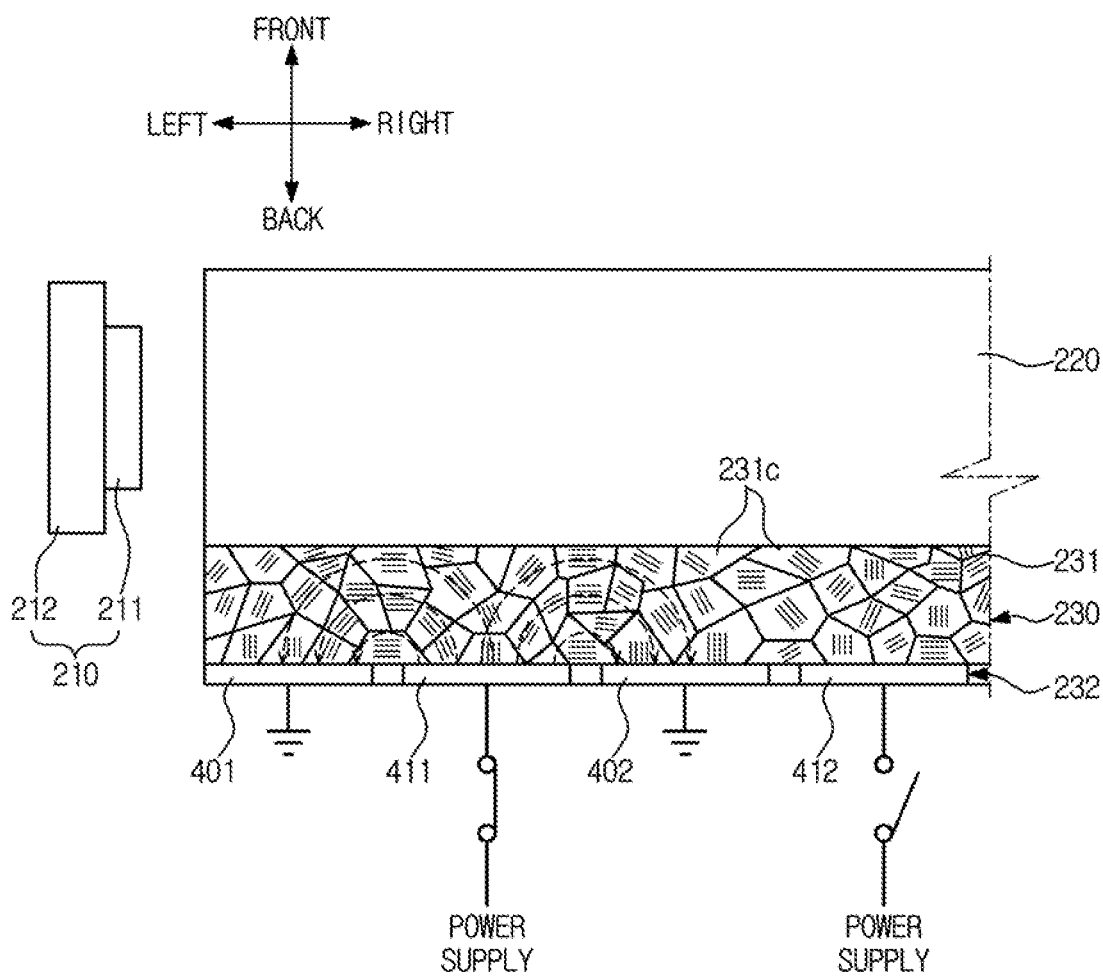
FIG. 9 shows another implementation example of a backlight unit according to an embodiment.

FIG. 9 shows another implementation example of a backlight unit according to an embodiment.

The backlight unit 200 includes the light source 211, the light guide plate 220, and the local dimming unit 230, and the local dimming unit 230 includes the electro-optical layer 231 and the plurality of electrodes 232. The light source 211, the light guide plate 220, and the plurality of electrodes 232 may be the same as those shown in FIGS. 6 and 7.

As shown in FIG. 9, the electro-optical layer 231 is provided between the light guide plate 220 and the plurality of electrodes 232, and may include a polymer network liquid crystal (PNLC) 231c whose optical properties change according to an electric field.

When the concentration of the polymer in the mixture of the liquid crystal and the polymer is 1% to 10%, the mixture is mainly composed of liquid crystal, and a diffusion network of a polymer chain may be formed throughout the mixture. As a result, the polymer network liquid crystal 231c in the form of a liquid or gel having viscosity can be manufactured.

The electro-optical properties of the polymer network liquid crystal 231c may be the same as the polymer dispersed liquid crystal 231b shown in FIG. 8.

As illustrated in FIG. 9, a voltage may be applied to the first signal electrode 411 and a voltage may not be applied to the second signal electrode 412. As a result, an electric field may be generated between the first signal electrode 411 and the second common electrode 402, and an electric field may not be generated between the second signal electrode 412 and the second common electrode 402. In other words, an electric field may be partially generated in the electro-optical layer 231.

The liquid crystal molecules of the polymer network liquid crystal 231c between the portion where the electric field is generated (between the first signal electrode and the second common electrode) may be aligned by the electric field, and the polymer network liquid crystal 231c can be made transparent. In addition, the light emitted from the light source 211 may pass through the transparent polymer network liquid crystal 231c.

The liquid crystal droplets of the polymer network liquid crystal 231c in the portion where the electric field is not generated (between the second signal electrode and the second common electrode) may be aligned in any direction, and the polymer network liquid crystal 231c can become opaque. In addition, the light emitted from the light source 211 is scattered by the opaque polymer network liquid crystal 231c, and may be emitted through the front surface 220a of the light guide plate 220.

Figure 10:
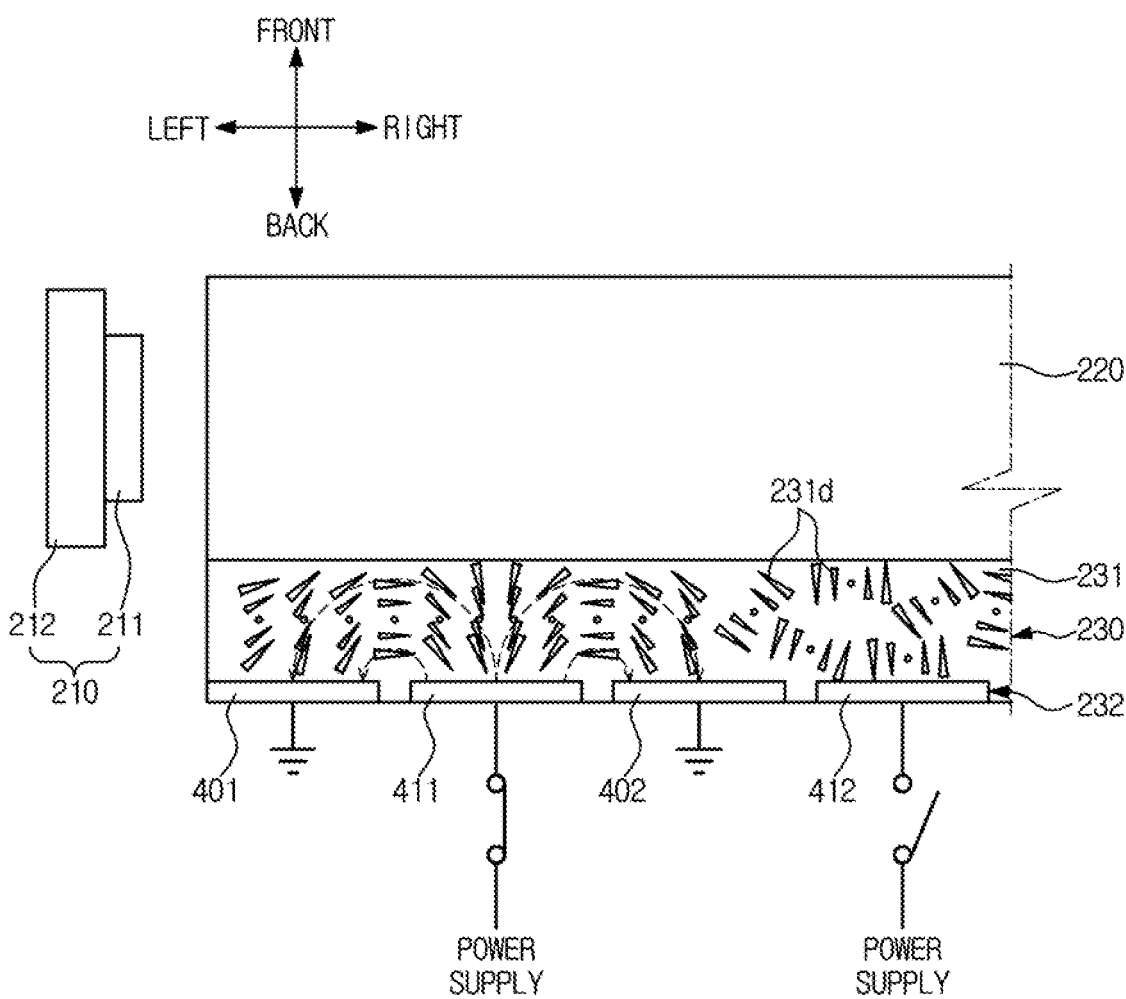
FIG. 10 shows another implementation example of a backlight unit according to an embodiment.

FIG. 10 shows another implementation example of a backlight unit according to an embodiment.

The backlight unit 200 includes the light source 211, the light guide plate 220, and the local dimming unit 230, and the local dimming unit 230 includes the electro-optical layer 231 and the plurality of electrodes 232. The light source 211, the light guide plate 220, and the plurality of electrodes 232 may be the same as those shown in FIGS. 6 and 7.

As shown in FIG. 10, the electro-optical layer 231 may be provided between the light guide plate 220 and the plurality of electrodes 232 and may include a cholesteric liquid crystal 231d whose optical properties change according to an electric field.

The cholesteric liquid crystal 231d has a layered structure and liquid crystal molecules are arranged in parallel with respect to each layer. Further, an arrangement direction of long axes of the liquid crystal molecules is slightly deviated between adjacent layers, and the entire liquid crystal has a spiral structure. Due to this helical structure, the cholesteric liquid crystal 231d has optical properties such as linearity, selective light scattering, circular light, dichroism, and the like.

Without an electric field, the cholesteric liquid crystal 231d has a spiral structure, but when an electric field is applied to the cholesteric liquid crystal 231d, the cholesteric liquid crystal 231d can be rearranged in the direction of the electric field. Specifically, the state of the cholesteric liquid crystal 231d may include a planar state in which the cholesteric liquid crystal 231d having a spiral structure is regularly arranged, a homeotropic state in which the cholesteric liquid crystal 231d is arranged in a line, and a focal conic state in which the cholesteric liquid crystal 231d having a helical structure is irregularly arranged. The homeotropic state is an unstable state, and the homeotropic state of the cholesteric liquid crystal 231d can transition to the planar state or the focal conic state when an external electric field is removed.

When high voltage is applied to both ends of the cholesteric liquid crystal 231d, the cholesteric liquid crystal 231d becomes homeotropic. In the homeotropic state, the cholesteric liquid crystal 231d can transmit light.

When the high voltage applied to both ends of the cholesteric liquid crystal 231d is removed in the homeotropic state, the cholesteric liquid crystal 231d. In the planar state, the cholesteric liquid crystal 231d can reflect light of a specific wavelength and pass light of a different wavelength.

When low voltage is applied to both ends of the cholesteric liquid crystal 231d in the homeotropic state, the cholesteric liquid crystal 231d transitions into the focal conic state, cholesteric liquid crystals can scatter light.

As shown in FIG. 10, a high voltage may be applied to the first signal electrode 411, and a low voltage may be applied to the second signal electrode 412.

The cholesteric liquid crystal 231d in the portion where the high voltage is applied (between the first signal electrode and the second common electrode) is in the homeotropic state, and can pass light.

The cholesteric liquid crystal 231d in the portion where the low voltage is applied (between the second signal electrode and the second common electrode) is in the focal conic state, and can scatter light. In addition, the light emitted from the light source 211 may be scattered by the opaque cholesteric liquid crystal 231d, and may be emitted through the front surface 220a of the light guide plate 220.

Figure 11:
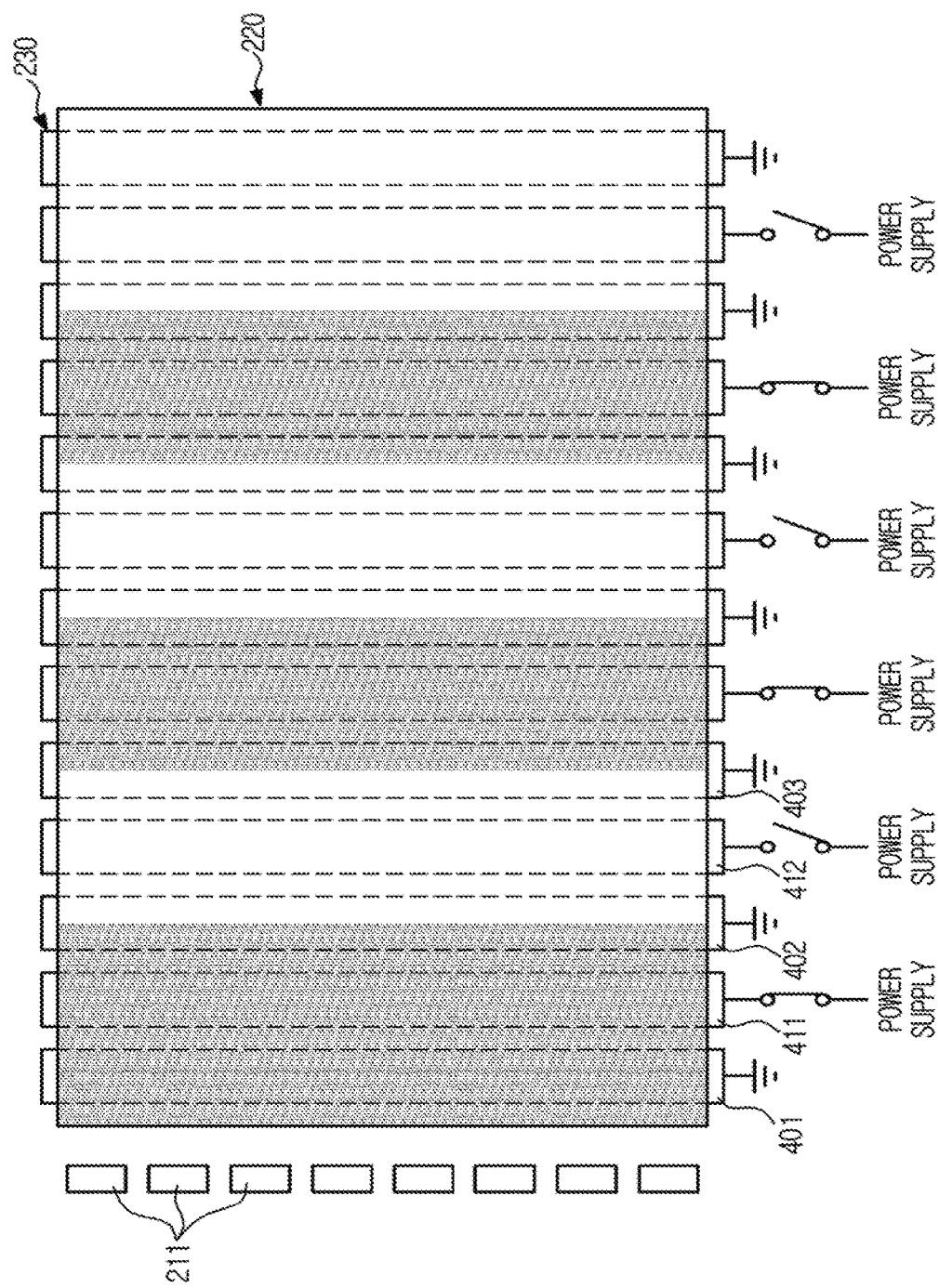
FIG. 11 shows an example of a top view of a backlight unit according to one embodiment.

FIG. 11 shows an example of a top view of a backlight unit according to one embodiment.

The backlight unit 200 includes the plurality of light sources 211, the light guide plate 220, and the local dimming unit 230. The local dimming unit 230 includes the electro-optical layer 231 and the plurality of electrodes 232. The plurality of light sources 211, the light guide plate 220, and the electro-optical layer 231 may be the same as those shown in FIGS. 6 and 7.

As shown in FIG. 11, the plurality of light sources 211 may be provided at a left edge portion of the light guide plate 220 and may emit light toward the right side of the light guide plate 220.

In addition, each of the plurality of electrodes 232 may have a rod shape extending from an upper side to a lower side of the backlight unit 200.

Specifically, the plurality of electrodes 232 may extend long in a direction perpendicular to a path through which light emitted from the plurality of light sources 211 propagates. In addition, the plurality of electrodes 232 in the form of a bar extending from the upper side to the lower side of the backlight unit 200 may be arranged side by side from left to right of the backlight unit 200. Therefore, the plurality of electrodes 232 may intersect the path through which the light emitted from the plurality of light sources 211 propagates.

The plurality of electrodes 232 include the common electrodes 232a and the signal electrodes 232b. The common electrodes 232a and the signal electrodes 232b may be arranged side by side on the same plane, and may also be alternately disposed on the same plane.

For example, the plurality of electrodes 232 may include the first common electrode 401, the second common electrode 402, the third common electrode 403, the first signal electrode 411, and the second signal electrode 412. The plurality of electrodes 232 are deployed in order of the first common electrode 401, the first signal electrode 411, the second common electrode 402, the second signal electrode 412, and the third common electrode 403.

The common electrodes 232a may be connected to ground or to each other.

The signal electrodes 232b may independently receive a voltage for generating an electric field. When a voltage is applied to the signal electrodes 232b, an electric field may be formed between the preferred electrode to which the voltage is applied and the peripheral common electrodes.

For example, as illustrated in FIG. 11, a voltage may be applied to the first signal electrode 411 and an electric field can be generated between the first signal electrode 411 and the first/second common electrodes 401 and 402. Therefore, the electro-optical material 231a around the first signal electrode 411 becomes transparent, and the light can pass through the electro-optical material 231a around the first signal electrode 411.

Also, a voltage may not be applied to the second signal electrode 412, and an electric field may not be generated between the second signal electrode 412 and the second/third common electrodes 402 and 403. Therefore, the electro-optical material 231a around the second signal electrode 412 becomes opaque, and light may be scattered by the electro-optical material 231a around the second signal electrode 412. The scattered light may be output through the front surface 220a of the light guide plate 220.

As such, the electro-optical material around the signal electrode to which the voltage is applied can pass light, and the electro-optical material around the signal electrode to which the voltage is not applied can scatter light. Light is output from the light guide plate 220 around the signal electrode to which no voltage is applied.

The backlight unit 200 may emit light having different luminance depending on the location. Specifically, the luminance of light emitted from the periphery of the signal electrode to which the voltage is not applied may be greater than the luminance of light emitted from the periphery of the signal electrode to which the voltage is applied. For example, when the voltage is alternately applied to the signal electrodes 232b as illustrated in FIG. 11, the backlight unit 200 may alternately emit low-intensity light and high-intensity light, depending on the location, and the low luminance portion and the high luminance portion on the backlight unit 200 may be formed as a stripe pattern.

In particular, the luminance according to the position of the backlight unit 200 may be controlled according to the voltage input to the signal electrodes 232b, and the backlight unit 200 may actively perform local dimming.

Figure 12:
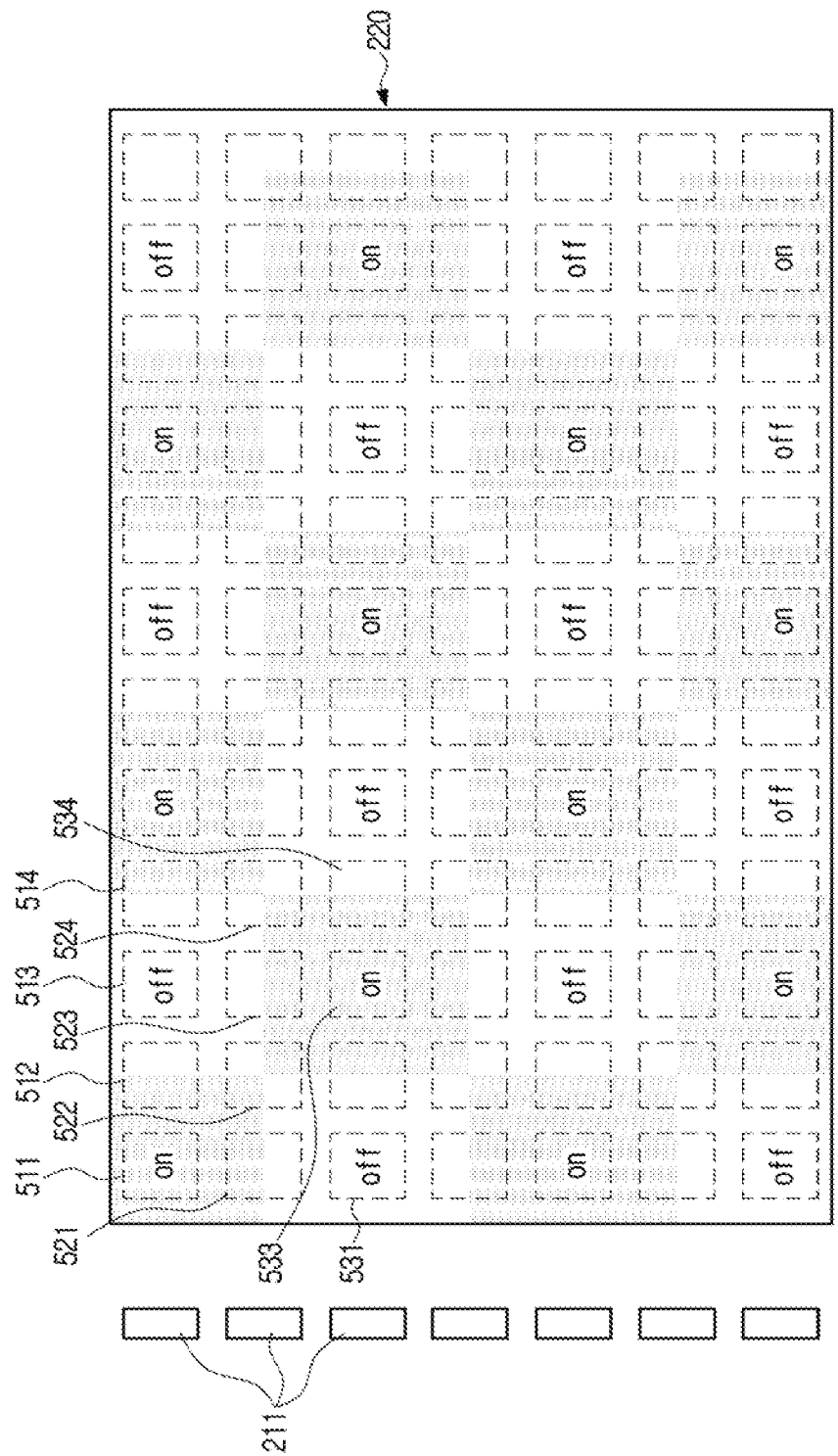
FIG. 12 shows another example of a top view of a backlight unit according to an embodiment.

FIG. 12 shows another example of a top view of a backlight unit according to an embodiment.

The backlight unit 200 includes the plurality of light sources 211, the light guide plate 220, and the local dimming unit 230, and the local dimming unit 230 may include the electro-optical layer 231 and the plurality of electrodes 232. The plurality of light sources 211, the light guide plate 220, and the electro-optical layer 231 may be the same as those shown in FIGS. 6 and 7.

As shown in FIG. 12, the plurality of light sources 211 may be provided at a left edge portion of the light guide plate 220 and may emit light toward the central portion of the light guide plate 220.

In addition, each of the plurality of electrodes 232 may have a "patch" shape, and may be aligned by aligning columns and rows on the backlight unit 200.

Specifically, the plurality of electrodes 232 may be arranged in a row from left to right along a path through which light emitted from the plurality of light sources 211 propagates. The plurality of electrodes 232 may also be arranged in a row from the top to the bottom in a direction perpendicular to the path through which light emitted from the plurality of light sources 211 propagates.

The plurality of electrodes 232 include the common electrodes 232a and the signal electrodes 232b. The common electrodes 232a and the signal electrodes 232b may be arranged side by side on the same plane, and may also be alternately disposed on the same plane. Specifically, the signal electrodes 232b and the common electrodes 232a may be alternately arranged not only in the horizontal direction but also in the vertical direction. As a result, eight of the common electrodes 232a may be disposed around each of the signal electrodes 232b.

For example, the signal electrodes 232b may include a signal electrode 11 (511), a signal electrode 13 (513), a signal electrode 31 (531) and a signal electrode 33 (533). The common electrodes 232a may include a common electrode 12 (512), a common electrode 14 (514), a common electrode 21 (521), a common electrode 22 (522), a common electrode 23 (523), a common electrode 24 (524), a common electrode 32 (532) and a common electrode 34 (534).

The common electrode 12 (512), the common electrode 21 (521), and the common electrode 22 (522) may be disposed around the signal electrode 11 (511). In addition, the common electrode 12 (512), the common electrode 14 (514), the common electrode 22 (522), the common electrode 23 (523), and the common electrode 24 (524) may be disposed around the signal electrode 13 (513).

The common electrodes 232a may be connected to ground or may be connected to each other.

The signal electrodes 232b may independently receive a voltage for generating an electric field. When a voltage is applied to the signal electrodes 232b, an electric field may be formed between the preferred electrode to which the voltage is applied and the peripheral common electrodes.

For example, as shown in FIG. 12, a voltage may be applied to the signal electrode 11 (511), and an electric field may be generated between the signal electrode 11 (511) and the common electrodes 12/21/22 (512, 521, 522). Therefore, the electro-optical material 231a around the signal electrode 11 (511) becomes transparent, and light can pass through the electro-optical material 231a around the signal electrode 11 (511).

Further, a voltage may not be applied to the signal electrode 13 (513), and an electric field may not be generated between the signal electrode 13 (513) and the common electrodes 12/14/22/23/24 (512, 514, 522, 523, 524). Therefore, the electro-optical material 231a around the signal electrode 13 (513) becomes opaque, and light can be scattered by the electro-optical material 231a around the signal electrode 13 (513). The scattered light may be output through the front surface 220a of the light guide plate 220.

As such, the backlight unit 200 may emit light having different luminance depending on the location. Specifically, the luminance of light emitted from the periphery of the signal electrode to which the voltage is not applied may be greater than the luminance of light emitted from the periphery of the signal electrode to which the voltage is applied. For example, when the voltage is alternately applied to the signal electrodes 232b, the backlight unit 200 may alternately emit low-intensity light and high-intensity light depending on the position, and the low luminance portion and the high luminance portion on the backlight unit 200 may be formed as a grid pattern as illustrated in FIG. 12.

Meanwhile, the disclosed embodiments may be implemented in the form of a recording medium that stores instructions executable by a computer. The instructions may be stored in the form of a program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those of ordinary skill in the art to which the posted embodiments belong will understand that they may be practiced in different forms from the disclosed embodiments without changing the technical spirit or essential features of the posted embodiments. The disclosed embodiments are illustrative and should not be construed as limiting.

The invention claimed is:

1. A display apparatus, comprising:
a light source emitting light;
a light guide plate having a first surface and a second surface, and configured to spread light emitted from the light source therein and to emit light through the first surface; and
a local dimming unit configured to pass or scatter light emitted through the second surface of the light guide plate according to a position; and wherein
the local dimming unit includes:
an electro-optical layer configured to which optical properties change according to an electric field; and
a plurality of electrodes positioned on the same plane to generate the electric field, the plurality of electrodes including a plurality of signal electrodes and a plurality of common electrodes,
wherein the electro-optical layer around at least one signal electrode among the plurality of signal electrodes passes light when a voltage is applied to the at least one signal electrode, and
wherein the light passing through the electro-optical layer is spread inside the light guide plate,
wherein a refractive index of the electro-optical layer changes depending on a strength of the electric field,
wherein a voltage for generating the electric field is applied to the plurality of signal electrodes,
wherein the plurality of common electrodes and the plurality of signal electrodes have a bar shape, and
wherein the plurality of common electrodes and the plurality of signal electrodes are alternately arranged side by side.

2. The display apparatus of claim 1, wherein the electro-optical layer around the at least one signal electrode scatters light when the voltage is not applied to the at least one signal electrode.

3. The display apparatus of claim 1, wherein the light scattered by the electro-optical layer is emitted through the first surface of the light guide plate.

4. The display apparatus of claim 1, wherein the plurality of signal electrodes includes a first signal electrode and a second signal electrode, and wherein a portion of the light guide plate corresponding to the second signal electrode is brighter than a portion corresponding to the first signal electrode.

5. The display apparatus of claim 1, wherein the plurality of electrodes reflects light passing through the electro-optical layer.

6. The display apparatus of claim 1, wherein scattering rate of the electro-optical layer changes depending on a presence of the electric field.

7. The display apparatus of claim 1, wherein the electro-optical layer passes light through when the electric field is present, and scatters the light when the electric field is not present.

8. The display apparatus of claim 1, wherein the electro-optical layer includes at least one of Polymer Dispersed Liquid Crystal (PDLC), Polymer Network Liquid Crystal (PNLC), Cholesteric Liquid Crystal, and Smectic Liquid Crystal.

* * * * *